United States Patent
Okoro

(10) Patent No.: US 11,760,682 B2
(45) Date of Patent: Sep. 19, 2023

(54) GLASS OR GLASS CERAMIC ARTICLES WITH COPPER-METALLIZED THROUGH HOLES AND PROCESSES FOR MAKING THE SAME

(71) Applicant: CORNING INCORPORATED, Corning, NY (US)

(72) Inventor: Chukwudi Azubuike Okoro, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 428 days.

(21) Appl. No.: 16/781,340

(22) Filed: Feb. 4, 2020

(65) Prior Publication Data
US 2020/0270163 A1  Aug. 27, 2020

Related U.S. Application Data

(60) Provisional application No. 62/808,566, filed on Feb. 21, 2019.

(51) Int. Cl.
*C03B 25/02* (2006.01)
*C03C 17/06* (2006.01)
(Continued)

(52) U.S. Cl.
CPC ............ *C03B 25/025* (2013.01); *C03C 3/06* (2013.01); *C03C 10/0009* (2013.01);
(Continued)

(58) Field of Classification Search
None
See application file for complete search history.

(56) References Cited

U.S. PATENT DOCUMENTS

| 208,387 A | 9/1878 | Geoege |
| 237,571 A | 2/1881 | Messier |

(Continued)

FOREIGN PATENT DOCUMENTS

| CN | 100494879 C | 6/2009 |
| CN | 103080034 A | 5/2013 |

(Continued)

OTHER PUBLICATIONS

Benjamin et al; "The Adhesion of Evaporated Metal Films on Glass"; Proc. Roy. Soc. A., vol. 261, (1962); pp. 516-531.

(Continued)

*Primary Examiner* — Lisa L Herring
(74) *Attorney, Agent, or Firm* — Amy T. Lang

(57) ABSTRACT

A process for heating a glass or glass ceramic article with copper-metallized through holes includes heating the article from a first temperature to a second temperature. The first temperature is greater than or equal to 200° C. and less than or equal to 300° C., and the second temperature is greater than or equal to 350° C. and less than or equal to 450° C. An average heating rate during the heating of the article from the first temperature to the second temperature is greater than 0.0° C./min and less than 8.7° C./min. An article includes a glass or glass ceramic substrate having at least one through hole penetrating the substrate in a thickness direction; and copper present in the at least one through hole. The article does not comprise radial cracks.

17 Claims, 13 Drawing Sheets

(51) Int. Cl.
*C03C 3/06* (2006.01)
*C03C 10/00* (2006.01)

(52) U.S. Cl.
CPC .......... *C03C 17/06* (2013.01); *C03C 2203/52* (2013.01); *C03C 2204/00* (2013.01); *C03C 2217/253* (2013.01)

(56) References Cited

U.S. PATENT DOCUMENTS

| | | |
|---|---|---|
| 3,798,013 A | 3/1974 | Hasegawa et al. |
| 4,214,886 A | 7/1980 | Shay et al. |
| 4,395,271 A | 7/1983 | Beall et al. |
| 4,732,780 A | 3/1988 | Mitoff et al. |
| 4,776,869 A | 10/1988 | Offenbacher et al. |
| 5,166,037 A | 11/1992 | Atkinson et al. |
| 5,340,947 A | 8/1994 | Credle et al. |
| 5,745,236 A | 4/1998 | Haga |
| 5,746,884 A | 5/1998 | Gupta et al. |
| 5,909,284 A | 6/1999 | Nakamura |
| 5,925,443 A | 7/1999 | Aoude et al. |
| 5,933,230 A | 8/1999 | Imaino et al. |
| 5,969,422 A | 10/1999 | Ting et al. |
| 6,072,624 A | 6/2000 | Dixon et al. |
| 6,077,780 A | 6/2000 | Dubin |
| 6,234,755 B1 | 5/2001 | Bunker et al. |
| 6,344,242 B1 | 2/2002 | Stolk et al. |
| 6,406,777 B1 | 6/2002 | Boss et al. |
| 6,734,101 B1 | 5/2004 | Bao |
| 6,906,795 B2 | 6/2005 | Goto et al. |
| 6,951,816 B2 | 10/2005 | Nopper et al. |
| 7,019,257 B2 | 3/2006 | Stevens |
| 7,043,072 B2 | 5/2006 | Goto et al. |
| 7,211,899 B2 | 5/2007 | Taniguchi et al. |
| 7,407,889 B2 | 8/2008 | Tsunetomo et al. |
| 7,514,149 B2 | 4/2009 | Bocko et al. |
| 7,528,967 B2 | 5/2009 | Okawauchi et al. |
| 7,626,665 B2 | 12/2009 | Koike |
| 7,683,370 B2 | 3/2010 | Kugimiya et al. |
| 7,749,809 B2 | 7/2010 | How et al. |
| 7,894,870 B1 | 2/2011 | Lucisano et al. |
| 7,994,503 B2 | 8/2011 | Hino et al. |
| 8,119,462 B2 | 2/2012 | Takasawa et al. |
| 8,163,649 B2 | 4/2012 | Koike et al. |
| 8,187,716 B2 | 5/2012 | Sutter et al. |
| 8,338,957 B2 | 12/2012 | Nilsson |
| 8,354,337 B2 | 1/2013 | Matsumoto et al. |
| 8,384,083 B2 | 2/2013 | Mori et al. |
| 8,411,459 B2 | 4/2013 | Yu et al. |
| 8,482,189 B2 | 7/2013 | Goto et al. |
| 8,531,679 B2 | 9/2013 | Scheiner |
| 8,535,997 B2 | 9/2013 | Kawakami et al. |
| 8,569,165 B2 | 10/2013 | Gordon et al. |
| 8,643,129 B2 | 2/2014 | Laming et al. |
| 8,673,779 B1 | 3/2014 | Yoon et al. |
| 8,699,037 B2 | 4/2014 | Cox |
| 8,742,588 B2 | 6/2014 | Nilsson et al. |
| 8,836,126 B2 | 9/2014 | Ochimizu et al. |
| 8,871,641 B2 | 10/2014 | Nilsson |
| 8,873,067 B2 | 10/2014 | Lee et al. |
| 9,024,443 B2 | 5/2015 | Inaba et al. |
| 9,093,381 B2 | 7/2015 | Barriere et al. |
| 9,140,539 B2 | 9/2015 | Scheiner |
| 9,232,652 B2 | 1/2016 | Fushie et al. |
| 9,236,274 B1 | 1/2016 | Mobley et al. |
| 9,278,886 B2 | 3/2016 | Boek et al. |
| 9,296,646 B2 | 3/2016 | Burket et al. |
| 9,305,470 B2 | 4/2016 | Miki et al. |
| 9,337,060 B1 | 5/2016 | Mobley et al. |
| 9,346,706 B2 | 5/2016 | Bazemore et al. |
| 9,374,892 B1 | 6/2016 | Mobley et al. |
| 9,377,583 B2 | 6/2016 | Giaretta et al. |
| 9,517,963 B2 | 12/2016 | Marjanovic et al. |
| 9,656,909 B2 | 5/2017 | Burket et al. |
| 9,676,046 B2 | 6/2017 | Hamada et al. |
| 9,745,220 B2 | 8/2017 | Burket et al. |
| 9,760,986 B2 | 9/2017 | Ramamurthy et al. |
| 9,832,868 B1 | 11/2017 | Wright et al. |
| 9,850,160 B2 | 12/2017 | Marjanovic et al. |
| 10,144,093 B2 | 12/2018 | Marjanovic et al. |
| 10,203,476 B2 | 2/2019 | Cui |
| 10,410,883 B2 | 9/2019 | Bellman et al. |
| 10,440,835 B1 | 10/2019 | Grober |
| 10,454,571 B2 | 10/2019 | Gutman et al. |
| 2002/0004301 A1 | 1/2002 | Chen et al. |
| 2002/0051563 A1 | 5/2002 | Goto et al. |
| 2002/0180015 A1 | 12/2002 | Yamaguchi et al. |
| 2003/0082356 A1 | 5/2003 | Suemasu et al. |
| 2003/0137056 A1 | 7/2003 | Taniguchi et al. |
| 2003/0206651 A1 | 11/2003 | Goto et al. |
| 2003/0221967 A1 | 12/2003 | Tsuchida et al. |
| 2004/0058476 A1 | 3/2004 | Enquist et al. |
| 2004/0094524 A1 | 5/2004 | Stevens |
| 2004/0166340 A1 | 8/2004 | Cairns et al. |
| 2004/0203181 A1 | 10/2004 | Shang et al. |
| 2004/0235294 A1 | 11/2004 | Imori et al. |
| 2004/0256619 A1 | 12/2004 | Nomura et al. |
| 2005/0029238 A1 | 2/2005 | Chen |
| 2005/0033184 A1 | 2/2005 | Christoph |
| 2005/0064707 A1 | 3/2005 | Sinha |
| 2005/0067295 A1 | 3/2005 | Dory et al. |
| 2005/0079650 A1 | 4/2005 | Mancini et al. |
| 2005/0266320 A1 | 12/2005 | Amemiya |
| 2006/0012766 A1 | 1/2006 | Klosner et al. |
| 2006/0093732 A1 | 5/2006 | Schut et al. |
| 2006/0192978 A1 | 8/2006 | Laguarta et al. |
| 2006/0233963 A1 | 10/2006 | Imori et al. |
| 2006/0283629 A1 | 12/2006 | Kikuchi et al. |
| 2007/0187142 A1 | 8/2007 | Suemasu et al. |
| 2008/0054467 A1 | 3/2008 | Ohba et al. |
| 2008/0067073 A1 | 3/2008 | Kagawa et al. |
| 2008/0087549 A1 | 4/2008 | Ishizuka et al. |
| 2008/0150138 A1 | 6/2008 | Bright et al. |
| 2008/0296768 A1 | 12/2008 | Chebiam et al. |
| 2009/0029189 A1 | 1/2009 | Moriwaki et al. |
| 2009/0032510 A1 | 2/2009 | Ando et al. |
| 2009/0117336 A1 | 5/2009 | Usui et al. |
| 2009/0263965 A1 | 10/2009 | Gordon et al. |
| 2009/0283910 A1 | 11/2009 | Hinomura |
| 2010/0096712 A1 | 4/2010 | Knechtel |
| 2010/0133697 A1 | 6/2010 | Nilsson |
| 2010/0284027 A1 | 11/2010 | Scheiner |
| 2010/0320604 A1 | 12/2010 | Isobayashi |
| 2011/0032467 A1 | 2/2011 | Koike |
| 2011/0049718 A1 | 3/2011 | Matsumoto et al. |
| 2011/0132883 A1 | 6/2011 | Sheng et al. |
| 2011/0147055 A1 | 6/2011 | Ma et al. |
| 2011/0294649 A1 | 12/2011 | Gomez et al. |
| 2011/0308942 A1 | 12/2011 | Liu et al. |
| 2012/0013022 A1 | 1/2012 | Sabuncuoglu Tezcan et al. |
| 2012/0048604 A1 | 3/2012 | Cornejo et al. |
| 2012/0092681 A1 | 4/2012 | Cox |
| 2012/0121870 A1 | 5/2012 | Toury et al. |
| 2012/0125892 A1 | 5/2012 | Shimoi et al. |
| 2012/0125893 A1 | 5/2012 | Shimoi et al. |
| 2012/0133047 A1 | 5/2012 | Besling et al. |
| 2012/0139127 A1 | 6/2012 | Beyne |
| 2012/0152843 A1 | 6/2012 | Mcevoy et al. |
| 2012/0168412 A1 | 7/2012 | Hooper |
| 2012/0196071 A1 | 8/2012 | Cornejo et al. |
| 2012/0217165 A1 | 8/2012 | Feng et al. |
| 2012/0235969 A1 | 9/2012 | Burns et al. |
| 2012/0241919 A1 | 9/2012 | Mitani |
| 2012/0276743 A1 | 11/2012 | Won et al. |
| 2013/0026645 A1 | 1/2013 | Mohammed et al. |
| 2013/0050226 A1 | 2/2013 | Shenoy et al. |
| 2013/0062210 A1 | 3/2013 | Fushie et al. |
| 2013/0075146 A1 | 3/2013 | Fushie et al. |
| 2013/0089701 A1 | 4/2013 | Hooper et al. |
| 2013/0105213 A1 | 5/2013 | Hu et al. |
| 2013/0119555 A1 | 5/2013 | Sundaram et al. |
| 2013/0163801 A1 | 6/2013 | Ha et al. |
| 2013/0205835 A1 | 8/2013 | Giaretta et al. |
| 2013/0224492 A1 | 8/2013 | Bookbinder et al. |
| 2013/0228918 A1 | 9/2013 | Chen et al. |

(56) References Cited

U.S. PATENT DOCUMENTS

| | | |
|---|---|---|
| 2013/0247615 A1 | 9/2013 | Boek et al. |
| 2013/0249109 A1 | 9/2013 | Ma et al. |
| 2013/0286610 A1 | 10/2013 | Nakagawa |
| 2013/0330515 A1 | 12/2013 | Oh et al. |
| 2013/0337599 A1 | 12/2013 | Yun |
| 2013/0340480 A1 | 12/2013 | Nattermann et al. |
| 2014/0013804 A1 | 1/2014 | Ono et al. |
| 2014/0034374 A1 | 2/2014 | Cornejo et al. |
| 2014/0084466 A1 | 3/2014 | Matsumoto et al. |
| 2014/0106146 A1 | 4/2014 | Decker et al. |
| 2014/0127899 A1 | 5/2014 | Cabral, Jr. et al. |
| 2014/0144681 A1 | 5/2014 | Pushparaj et al. |
| 2014/0147623 A1 | 5/2014 | Shorey et al. |
| 2014/0147624 A1 | 5/2014 | Streltsov et al. |
| 2014/0154439 A1 | 6/2014 | Demartino et al. |
| 2014/0166199 A1 | 6/2014 | Bellman et al. |
| 2014/0170378 A1 | 6/2014 | Bellman et al. |
| 2014/0186617 A1 | 7/2014 | Zhang et al. |
| 2014/0199519 A1 | 7/2014 | Schillinger et al. |
| 2014/0254004 A1 | 9/2014 | Wooder et al. |
| 2014/0262801 A1 | 9/2014 | Jayaraju et al. |
| 2014/0300728 A1 | 10/2014 | Drescher et al. |
| 2014/0363971 A1 | 12/2014 | Matsumoto |
| 2014/0376006 A1 | 12/2014 | Scheiner |
| 2015/0021775 A1 | 1/2015 | Matsumoto et al. |
| 2015/0036065 A1 | 2/2015 | Yousefpor et al. |
| 2015/0060402 A1 | 3/2015 | Burkett et al. |
| 2015/0076677 A1 | 3/2015 | Ebefors |
| 2015/0083469 A1 | 3/2015 | Sunohara et al. |
| 2015/0099124 A1 | 4/2015 | Beunet et al. |
| 2015/0102498 A1 | 4/2015 | Enicks et al. |
| 2015/0166393 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0239775 A1 | 8/2015 | Amin et al. |
| 2015/0274583 A1 | 10/2015 | An et al. |
| 2015/0306847 A1 | 10/2015 | Bellman et al. |
| 2015/0329415 A1 | 11/2015 | Bellman et al. |
| 2015/0353348 A1 | 12/2015 | Vandemeer et al. |
| 2016/0026842 A1 | 1/2016 | Withers et al. |
| 2016/0107925 A1 | 4/2016 | Burket et al. |
| 2016/0111380 A1 | 4/2016 | Sundaram et al. |
| 2016/0166395 A9 | 6/2016 | Weiman |
| 2016/0176751 A1 | 6/2016 | Lautenschlaeger et al. |
| 2016/0199944 A1 | 7/2016 | Hosseini |
| 2016/0201474 A1 | 7/2016 | Slavens et al. |
| 2016/0204126 A1 | 7/2016 | Amano |
| 2016/0208387 A1 | 7/2016 | Liu et al. |
| 2016/0219704 A1 | 7/2016 | Vandemeer et al. |
| 2016/0237571 A1 | 8/2016 | Liu et al. |
| 2016/0282584 A1 | 9/2016 | Cui |
| 2016/0305764 A1 | 10/2016 | Cui et al. |
| 2016/0312365 A1 | 10/2016 | Cordonier et al. |
| 2016/0317821 A1 | 11/2016 | Morioka et al. |
| 2016/0327744 A1 | 11/2016 | Giaretta et al. |
| 2016/0334203 A1 | 11/2016 | Cui et al. |
| 2016/0351410 A1 | 12/2016 | Fu et al. |
| 2016/0368100 A1 | 12/2016 | Marjanovic et al. |
| 2016/0376186 A1 | 12/2016 | Gross |
| 2017/0008122 A1 | 1/2017 | Wieland et al. |
| 2017/0036419 A1 | 2/2017 | Adib et al. |
| 2017/0160077 A1 | 6/2017 | Featherstone et al. |
| 2017/0207160 A1 | 7/2017 | Gowda et al. |
| 2017/0228884 A1 | 8/2017 | Yoshida |
| 2017/0229318 A1 | 8/2017 | Tsunetomo et al. |
| 2017/0252859 A1 | 9/2017 | Kumkar et al. |
| 2017/0276951 A1 | 9/2017 | Kumkar et al. |
| 2017/0287728 A1 | 10/2017 | Dahlberg et al. |
| 2017/0301585 A1 | 10/2017 | Koelling et al. |
| 2017/0363417 A1 | 12/2017 | Cui et al. |
| 2018/0057390 A1 | 3/2018 | Hackert et al. |
| 2018/0062342 A1 | 3/2018 | Comstock et al. |
| 2018/0068868 A1 | 3/2018 | Jaramillo et al. |
| 2018/0093914 A1 | 4/2018 | Akarapu et al. |
| 2018/0215647 A1 | 8/2018 | Ortner et al. |
| 2018/0249581 A1 | 8/2018 | Mamezaki et al. |
| 2018/0340262 A1 | 11/2018 | Hiranuma |
| 2018/0342450 A1 | 11/2018 | Huang et al. |
| 2018/0342451 A1 | 11/2018 | Dahlberg et al. |
| 2019/0239353 A1 | 8/2019 | Jayaraman |
| 2019/0269013 A1 | 8/2019 | Takagi et al. |
| 2019/0273038 A1 | 9/2019 | Nagano et al. |
| 2019/0304877 A1 | 10/2019 | Mobley et al. |
| 2019/0327840 A1 | 10/2019 | Bookbinder et al. |
| 2020/0227277 A1 | 7/2020 | Brown et al. |
| 2021/0043464 A1 | 2/2021 | Nolet et al. |

FOREIGN PATENT DOCUMENTS

| | | | |
|---|---|---|---|
| CN | 103219278 A | 7/2013 | |
| CN | 104112696 A * | 10/2014 | ......... H01L 21/7684 |
| CN | 104112696 A | 10/2014 | |
| CN | 104364927 A | 2/2015 | |
| CN | 104768320 A | 7/2015 | |
| CN | 104897062 A | 9/2015 | |
| CN | 105448809 A | 3/2016 | |
| CN | 109075080 A | 12/2018 | |
| EP | 0247993 A1 | 12/1987 | |
| EP | 280918 A2 | 9/1988 | |
| EP | 2095698 B1 | 9/2011 | |
| EP | 3166372 A1 | 5/2017 | |
| JP | 03-196664 A | 8/1991 | |
| JP | 2001-044197 A | 2/2001 | |
| JP | 2002-134659 A | 5/2002 | |
| JP | 2003-148931 A | 5/2003 | |
| JP | 2004-311919 A | 11/2004 | |
| JP | 2004-363212 A | 12/2004 | |
| JP | 2005-257339 A | 9/2005 | |
| JP | 2006-287019 A | 10/2006 | |
| JP | 2007059796 A | 3/2007 | |
| JP | 2008-288577 A | 11/2008 | |
| JP | 2010-074017 A | 4/2010 | |
| JP | 2011-171334 A | 9/2011 | |
| JP | 2011-178642 A | 9/2011 | |
| JP | 2013-106015 A | 5/2013 | |
| JP | 2013-220958 A | 10/2013 | |
| JP | 2014093406 A | 5/2014 | |
| JP | 2014-524278 A | 9/2014 | |
| JP | 2015-060981 A | 3/2015 | |
| JP | 2015-082598 A | 4/2015 | |
| JP | 2015-095590 A | 5/2015 | |
| JP | 2015-146410 A | 8/2015 | |
| JP | 2016213253 A | 12/2016 | |
| JP | 2017-022220 A | 1/2017 | |
| JP | 2017-063109 A | 3/2017 | |
| JP | 2017-098466 A | 6/2017 | |
| JP | 2017-204527 A | 11/2017 | |
| JP | 2018-113392 A | 7/2018 | |
| JP | 2018163986 A | 10/2018 | |
| KR | 10-0803004 B1 | 2/2008 | |
| KR | 10-2019-0003050 A | 1/2019 | |
| TW | 201238387 A | 9/2012 | |
| WO | 94/00966 A1 | 1/1994 | |
| WO | 03/21004 A1 | 3/2003 | |
| WO | 2004024191 A2 | 3/2004 | |
| WO | 2005/063645 A1 | 7/2005 | |
| WO | 2006/129354 A1 | 12/2006 | |
| WO | 2008/110061 A1 | 9/2008 | |
| WO | 2011/050073 A1 | 4/2011 | |
| WO | 2012/027220 A2 | 3/2012 | |
| WO | 2015/113023 A1 | 7/2015 | |
| WO | 2015/157202 A1 | 10/2015 | |
| WO | 2016/010954 A2 | 1/2016 | |
| WO | 2016/089844 A1 | 6/2016 | |
| WO | 2016/114133 A1 | 7/2016 | |
| WO | 2016118683 A1 | 7/2016 | |
| WO | 2016/176171 A1 | 11/2016 | |
| WO | 2017/038075 A1 | 3/2017 | |
| WO | 2017/062798 A1 | 4/2017 | |
| WO | 2017/210376 A1 | 12/2017 | |
| WO | 2018/101468 A1 | 6/2018 | |
| WO | 2018/162385 A1 | 9/2018 | |
| WO | 2019055745 A1 | 3/2019 | |

(56) References Cited

FOREIGN PATENT DOCUMENTS

OTHER PUBLICATIONS

Borghi et al; "M2 Factor of Bessel-Gauss Beams"; Optics Letiers; vol. 22, No. 5; (1997) pp. 262-264.
Chen et al. "Development of an AOI system for chips with a hole on backside based on a frame imager" Proc. of SPIE vol. 9903, 2016. 6 pgs.
Choa, Microsystem Technologies, Reliability study of hermetic wafer level MEMS packaging with through-wafer interconnect, Feb. 2009, vol. 15, pp. 677-686 (Year: 2009).
Iijima et al; "Resistivity Reduction By External Oxidation of Cu—Mn Alloy Films for Semiconductor Interconnect Application"; Journal of Vacuum Science & Technology B: Microelectronics and Nanometer Structures Processing, Measurement, and Phenomena, 27, 1963-1968 (2009.
Invitation to Pay Additional Fees of the International Searching Authority PCT/US2019/026342; dated Jul. 16, 2019; 14 Pages; European Patent Office.
Invitation to Pay Additional Fees of the International Searching Authority PCT/US2019/057757; dated Mar. 2, 2020; 12 Pages; European Patent Office.
Kiyama et al; "Examination of Etching Agent and Etching Mechanism on Femtosecond Laser Microfabrication of Channels Inside Vitreous Silica Substrates"; J. Phys. Chem. C, 2009, 113, pp. 11560-11566.
Koike et al; "P-33: Cu—Mn Electrodes for a-Si TFT and Its Electrical Characteristics"; SID Symposium Digest of Technical Papers, 41:1, 1343-1346 (2010).
Koike et al; "Self-Forming Diffusion Barrier Layer in Cu—Mn Alloy Metallization"; Appl Phys. Lett. 87, 041911-1-041911-3 (2005).
Microchemicals, "Silicon Wafers, Quartz Wafers, Glass Wafers," Product Specifications: Brochure. 2014, 28 pgs.
Schott, Schott HermeS (Registered)—Hermetic Through Glass Vias (TGV), Jul. 2016 (Year: 2016).
Shorey; "Leveraging Glass for Advanced Packaging and IoT"; Apr. 21, 2016, Retrieved Form the Internet: URL:http://www.corning.com/media/worldwide/cdt/documents/iMAPs%20-%20Corning%200verview%20-%204-21-16%20FINALpptx.pdf.
Siegman; "New Development in Laser Resonators"; SPIE, vol. 1227, Optical Resonators (1990) pp. 2-14.
Thiele; "Relation Between Catalytic Activity and Size of Particle"; Industrial and Engineering Chemistry, vol. 31, No. 7; (1939) pp. 916-920.
Topper et al; "3-D Thin Film Interposer Based on TGV (Through Glass Vias): An Alternative to Si-Interposer"; IEEE, Electronic Components and Technology Conference; 2010; pp. 66-73.
U.S. Appl. No. 62/846,059; Cai et al. "Silicate Glass Compositions Useful for the Efficient Production of Through Glass Vias", filed May 10, 2019, 43 pgs.
Wakayama et al. "Small size probe for inner profile measurement of pipes using optical fiber ring beam device" Proc. of SPIE vol. 8563, 2012. 7 pgs.
Wu et al, "A Study on Annealing Mechanisms with Different Manganese Contents in CuMn Alloy"; Journal of Alloys and Compounds, vol. 542, 2012, pp. 118-123.
Yun et al; "P-23:The Contact Properties and TFT Structures of A-IGZO TFTs Combined with Cu—Mn Alloy Electrodes"; SID Symposium Digest of Technical Papers 42:1, 1177-1180, Year: 2011.
Zavyalov, "3D Hole Inspection Using Lens with High Field Curvature" Measurement Science Review, V. 15, No. 1, 2015. pp 52-57.
Chao; "Reliability Study of Hermetic Wafer Level MEMS Packaging with Through-Wafer Interconnect"; Microsystem Technologies; 2009, vol. 15, pp. 677-686.
Anthony et al; "Microfabrication in Foturan Photosensitive Glass Using Focused Ion Beam" ; Proceedings of the World Congress on Enbineering; vol. II; 2007; 6 Pages.

Lueck et al; "Through Glass Vias (TGV) and Aspects of Reliability"; 2015 IEEE Electronic Components and Technology Conference; pp. 672-677 2015.
Bush, Glass seals MEMS for harsh environments, Nov. 2014, Electronics Weekly, <https://www.electronicsweekly.com/news/business/manufacturing/glass-seals-mems-harsh-environments-2014-11/> (Year: 2014).
Chang et al., Communication—Defect-Free Filling of High Aspect Ratio Through Vias in Ultrathin Glass, Nov. 2018, Journal of Electrochemical Society, vol. 166, No. 1 (Year: 2018).
Fu et al., Adhesive enabling technology for directly plating copper onto glass/ceramic substrates, May 2014, 2014 IEEE 64th Electronic Components and Technology Conference (ECTC) (Year: 2014).
Keusseyan et al., Material and Process Developments for Robust and High Reliability Glass Wafers for 2.5D Packaging, Jan. 2015, Additional Conferences (Device Packaging, HiTEC, HiTEN, and CICMT) 2015 (Year: 2015).
Krohnert et al., Through Glass Vias for hermetically sealed High Frequency Application, Jan. 2019, Additional Conferences (Device Packaging, HiTEC, HiTEN, and CICMT) 2019 (Year: 2019).
Kuramochi et al., Glass Substrate with TGV(Thru Glass Via) Manufacturing Technology for Display Electronics, Jun. 2017, Society for Information Display Digest of Technical Papers, vol. 48, Issue 1, pp. 1201-1204 (Year: 2017).
Lee et al., Through-glass copper via using the glass reflow and seedless electroplating processes for wafer-level RF MEMS packaging, Jun. 2013, Journal of Micromechanics and Microengineering, vol. 23, No. 8 (Year: 2013).
Li et al., Fabrication of high-density elecliical feed-throughs by deep-reactive-ion etching of Pyrex glass, Dec. 2002, Journal of Microelectromechanical Systems, vol. 11, Issue 6, pp. 625-630 (Year: 2002).
Liu et al., Failure analysis of through-silicon vias in free-standing wafer under thermal-shock test, Jan. 2013, Microelectronics Reliability, vol. 53, Issue 1, pp. 70-78 (Year: 2013).
Mobley et al., High-reliability via interconnections in glass wafers for2.5D packaging, Oct. 2014, Chip Scale Review, vol. 18, No. 5, pp. 36-38 (Year: 2014).
Ogutu et al., Superconformal Filling of Through Vias in Glass Interposers, Jun. 2014, ECS Electrochemistry Letters, vol. 3, No. 8 (Year: 2014).
Shah et al., Low-Loss, High-Linearity RF Interposers Enabled by Through Glass Vias, Nov. 2018, IEEE Microwave and Wireless Components Letters, vol. 28, Issue 11, pp. 960-962 (Year: 2018).
Shorey et al., "Advancements in Fabrication of Glass Interposers", Electronic Components & Technology Conference,2014, pp. 6.
Sukumaran et al., Low-Cost Thin Glass Interposers as a Superior Alternative to Silicon and Organic Interposers for Packaging of 3-D ICs, Sep. 2012, IEEE Transactions on Components, Packaging and Manufacturing Technology, vol. 2, Issue 9, pp. 1426-1433 (Year: 2012).
Takahashi et al., "Development of High Frequency Device using Glass or Fused Silica with 3D Integration," Electronics Components and Technology Conference, 2017, pp. 758-763.
Takahashi et al., Development of Through Glass Via (TGV) formation technology using electrical discharging for2.5/3D integrated packaging, May 2013, 2013 IEEE 63rd Electronic Components and Technology Conference (Year: 2013).
Topper et al., 3-D Thin Film Interposer Based on TGV (Through Glass Vias): An Alternative to Si-Interposer, Jun. 2010, 2010 Proceedings 60th Electronic Components and Technology Conference (ECTC) (Year: 2010).
Woehrmann et al., Glass based interposers for RF applications up to 100GHz, Sep. 2016, 2016 6th Electronic System-Integration Technology Conference (ESTC) (Year: 2016).
Department of Defense, MIL-STD-750E, Nov. 2006 (Year: 2006).
ESPEC Corp., The Concept of Relative Humidity in HAST, Feb. 2013, <https://www.test-navi.com/eng/research/handbook/pdf/07_TheConceptOfRelativeHumidityInHAST.pdf> (Year: 2013).
Keusseyan et al., RDL Multilayer Metallization Approaches for TGV, Jan. 2017, Additional Conferences (Device Packaging, HiTEC, HiTEN, and CICMT) (Year: 2017).

(56) References Cited

OTHER PUBLICATIONS

Schott, "MEMS Tightly Sealed with SCHOTT HermeS (Trademark)", Jan. 2010, Tech Buzz: Electronic Packaging, Issue 2, <https://www.schott.com/d/epackaging/8e070fc9-4009-40c2-bca7-323542ee3a15/1.4/schott_tech_buzzJan_2010.pdf> (Year: 2010).

TJ Green Associates, "Hermetic vs "Near Hermetic" Packagingi A Technical Review", Sep. 2016, <https://www.tjgreenllc.com/2016/09/21/hermetic-vs-near-hermetic-packaging-a-technical-review/> (Year: 2016).

University of Maryland, Temperature Humidity Bias, Jun. 2008, <https://calce.umd.edu/temperature-humidity-bias> (Year: 2008).

Allvia; "Allvia Launches New Product Lines for Through Glass Vias (TGV) and Through Ouartz Vias (TQV)"; 2 Pages; https://www.allvia.com/news/1606_allvia_launches_new_product_lines_for_through_glass_vias_and_through_quartz_vias.html; retrieved on Sep. 30, 2019.

Bain et al; "Formation of Monolayers by the Coadsorption of Thiols on Gold: Variation in the Head Group, Tail Group, and Solvent"; Journal of the American Chemical Society; 111; pp. 7155-7164 (1989.

Cui et al; "The Evolution Of Pd/Sn Catalytic Surfaces in Electroles Copper Deposition"; Journal of the Electrochemical Society; 158, (3), pp. D172-D177 (2011.

Demir et al; "First Demonstration of Reliabi F Copper-Plated 30m Diameter Through-Package-Vias in Ultra-Thin Bare Glass Interposers" 2014 IEEE 64th Electronic Components and Technology Conference (ECTC.

Demir et al; "Reliability of Copper Through-Package Vias in Bare Glass Interposers" ; IEEE Transactions on Components, Packaging and Manufacturing Technology; vol. 7, No. 6 pp. 829-837; (2017.

Dixit et La; "Structural and Electronic Properties of A Mn Oxide Diffusion Barrier Layer Formed By Chemical Vapor Deposition"; IEEE Transactions on Device and Materials Reliability, vol. 11, No. 2; pp. 295-302 (2011.

Dow et al; "Through-Hole Filling by Copper Electroplating"; Journal of the Electrochemical Society, 155 (12) D750-D757, (2008.

Gordon et al; "Chemical Vapor Deposition (CVD) of Manganese Self-Aligned Diffusion Barries for Cu Interconnections in Microelectronics"; Advanced Metallization Conference 2008; pp. 321-329 (2009.

Hunegnaw et al; Vitrocoat GI—Ultra-Thin Adhesive Layer for Metallization of Glass Iterposer: 2015 10th International Microsystems, Packaging, Assembly, and Circuits Technology Conference (Impact) 4 Pages.

Intergrace, "Borosilicate Glass: Technical Glass By Pulles & Hanique: Duan & Pyrex," Pulles & Hanique B.V., 2 Pgs. Published Mar. 15, 2012, Retrieved From: https://web.archive.org/web/20120315092729/http://www.pulleshanique.com/02_borosilicate-glass.htm.

Kanemoto et al; "Electroless Copper Plating Process by Applying Alternating One-Side Air Stirring Method for High-Aspect-Ratio Through-Holes"; J. Electrochem. Soc. 2017 vol. 164, Issue 12, D771-D777.

Liu et al; "Electroless and Electrolytic Copper Plating of Glass Interposer Combined with Metal Oxide Adhesion Layer for Manufacturing 3D RF Devices" ; IEEE 66th Electronic Components and Technology Conference; pp. 62-67 (2016.

Lu et al; "Thermo-Mechanical Reliability of 3-D Ics Contianing Through Silicon Vias"; IEEE Electronic Components and Technology Conference; pp. 630-634 (2009.

U.S. Appl. No. 16/578,751 Titled; "Methods for Increasing Adhesion Between Metallic Films and Glass Surfaces and Articles Made Therefrom", Bookbinder et al; filed Sep. 23, 2019. 37 pgs.

Metwalli et al; "Surface Characterization of Mono-, Di-, and Tri-Aminosiline Treated Glass Surface"; Journal of Colloid and Interface Science, 298 (2006) pp. 825-831.

Neishi et al; "Formation of a Manganese Oxide Barrier Layer with Thermal Chemical Vapor Deposition for Advanced Large-Scale Integrated Interconnect Structure"; Appl. Phys. Lett.; 93; pp. 032106-1- 032106-3 (2008).

Ogutu et al; "Hybrid Method for Metallization of Glass Interposer"; Journal of the Electrochemical Society; vol. 160; No. 12; pp. D3228-D3236 (2013).

Ogutu et al; "Superconformal Filling of High Aspect Ration Through Glass Vias (TGV) for Interposer Applications Using TNBT and NTBC Additives"; Journal of the Electrochemical Society; 162 (9) pp. D457-D464 (2015).

Pallavicini et al; "Self-Assembled Monolayers of Silver Nanoparticles Firmly Grafted on Glass Surfaces: Low Ag+ Release for an Efficient Antibacterial Activity"; Journal of Colloid and Interface Science; 350 (2010) 110-116.

Phuong et al; "Structural Characterization of a Manganese Oxide Barrier Layer Formed by Chemical Vapor Deposition for Advanced Interconnects Application on SiOC Dielectric Substrates"; J. Phys. Chem. C; 117; pp. 160-164 (2013.

Ryu et al; "Impact of Near-Surface Thermal Stresses on Interfacial Reliability of Through-Silicon Vias for 3-D Interconnects"; IEEE Transactions on Device and Materials Reliability 11 (1) pp. 35-43 (2011.

Shachman-Diamond et al; "30 Years of Electroless Plating for Semiconductor and Polymer Mirco-Systems"; Microelectronic Engineering; 132 (2015) pp. 35-45.

Shen et al; "Periodic Pulse Reverse Cu Plating for Through-Hole Filling" ECS Electrochem. Lett. 2013 vol. 2, Issue 5, D23-D25, 2013.

Shorey et al; "Advancements in Fabrication of Glass Interposers"; 2014 Electronic Components & Technology Conference; IEEE; pp. 20-25 (2014.

Shorey et al; "Progress and Application of Through Glass Via (TGV) Technolgy", Corning Incorporated; 6 Pages (2016.

Sukumaran; "Through-Package-Via Hole Formation, Metallization and Characterization for Ultra-Thin 3D Glass" 2014; Georgia Institute of Technology, a Dissertation; 201 Pages.

Takahashi et al; "Development of High Frequency Device Using Glass or Fused Silica with 3D Integration"; 67th Electornic Componsents and Technology Conference; IEEE; pp. 758-763 (2017.

Aric Shorey, et al., "Advancements in Fabrication of Glass Interposers", 2014 IEEE 64th Electronic Components and Technology Conference (ECTC), 2014, pp. 20-25.

Chinese Patent Application No. 202080025773.9, Office Action, dated Dec. 26, 2022, 4 pages Chinese Patent Office.

* cited by examiner

GLASS OR GLASS CERAMIC ARTICLES WITH COPPER-METALLIZED THROUGH HOLES AND PROCESSES FOR MAKING THE SAME

This application claims the benefit of priority to U.S. Provisional Application Ser. No. 62/808,566 filed on Feb. 21, 2019, the content of which is relied upon and incorporated herein by reference in its entirety.

BACKGROUND

Field

The present specification generally relates to processes for manufacturing glass or glass ceramic and glass or glass ceramic ceramics articles with copper-metallized conductive through holes, and is particularly related to processes for heating glass or glass ceramic articles with copper-metallized through holes to reduce radial cracking.

Technical Background

Glass and glass ceramics substrates are used in components of electronic devices because the glass and glass ceramic substrates, generally, do not react with other components of the electronic devices. This may be, in part, because glass and glass ceramic substrates have a low dielectric constant, and because glass and glass ceramic substrates are thermally stable. In many electronic devices, the glass and glass ceramic substrates have through holes that can be rendered conductive by introducing metal into the through-holes, such as, for example, interposers. To use glass and glass ceramic substrates for components of electronic devices, such as, for example, interposers, a conductive metal layer is applied to one or more surfaces of the glass and glass ceramic substrate and the conductive metal fills the through-holes in the glass and glass ceramic substrate. One metal that is commonly used to fill the through holes in glass and glass ceramics substrates is copper (Cu) because of its high electrical conductivity. However, upon heating a glass or glass ceramic article comprising a copper-metallized through hole, radial cracks can form adjacent to the through hole, which can render the glass or glass ceramics article comprising copper-metallized through holes less efficient or unusable.

Accordingly, a need exists for a process that reduces radial cracking in glass and glass ceramic articles comprising copper-metallized through holes during heating.

SUMMARY

According to a first clause, process comprises heating a glass or glass ceramic article comprising copper-metallized through holes from a first temperature to a second temperature, wherein the first temperature is greater than or equal to 200° C. and less than or equal to 300° C., and wherein the second temperature is greater than or equal to 350° C. and less than or equal to 450° C., wherein an average heating rate during the heating of the glass or glass ceramic article comprising copper-metallized through holes from the first temperature to the second temperature is greater than 0.0° C./min and less than 8.7° C./min.

A second clause includes the process of the first clause, wherein the heating of the glass or glass ceramic article comprising copper-metallized through holes from the first temperature to the second temperature does not cause radial cracks in the glass or glass ceramic article comprising copper-metallized through holes.

A third clause includes a process of any of the preceding clauses, further comprising heating the glass or glass ceramic article comprising copper-metallized through holes from room temperature to the first temperature.

A fourth clause includes the process of the third clause, wherein an average heating rate during the heating of the glass or glass ceramic article comprising copper-metallized through holes from room temperature to a first temperature is greater than 0.0° C./min and less than 8.7° C./min.

A fifth clause includes a process of any of the preceding clauses, wherein the first temperature is from greater than or equal to 225° C. and less than or equal to 275° C.

A sixth clause includes a process of any of the preceding clauses, wherein the second temperature is from greater than or equal to 375° C. and less than or equal to 425° C.

A seventh clause includes a process of any of the preceding clauses, wherein the average heating rate during the heating of the glass or glass ceramic article comprising copper-metallized through holes from the first temperature to a second temperature is greater than or equal to 1.0° C./min and less than or equal to 6.5° C./min.

An eighth clause includes a process of any of the preceding clauses, wherein the average heating rate during the heating of the glass or glass ceramic article comprising copper-metallized through holes from the first temperature to a second temperature is substantially constant.

A ninth clause includes a process of any of the preceding clauses, wherein the average heating rate during the heating of the glass or glass ceramic article comprising copper-metallized through holes from the first temperature to a second temperature is variable A tenth clause includes a process of any of the preceding clauses, wherein the process further comprises holding the glass or glass ceramic article comprising copper-metallized through holes at the first temperature for a duration of greater than or equal to 10 minutes and less than or equal to an hour.

An eleventh clause includes a process of any of the preceding clauses, wherein the process further comprises holding the glass or glass ceramic article comprising copper-metallized through holes at the second temperature for a duration of greater than or equal to 10 minutes and less than or equal to an hour.

A twelfth clause includes a process of any of the preceding clauses, wherein the heating of the glass or glass ceramic article comprising copper-metallized through holes from the first temperature to a second temperature comprises holding the glass or glass ceramic article comprising copper-metallized through holes at a constant temperature for a duration that is greater than or equal to 10 minutes and less than or equal to 45 minutes.

A thirteenth clause includes a process of any of the preceding clauses, wherein a diameter of the through holes in the glass or glass ceramic article comprising copper-metallized through holes is greater than or equal to 25 μm and less than or equal to 75 μm.

A fourteenth clause includes a process of any of the preceding clauses, wherein a pitch of the through holes in the glass or glass ceramic article comprising copper-metallized through holes is greater than or equal to 60 μm and less than or equal to 800 μm.

A fifteenth clause includes a process of any of the preceding clauses, wherein a depth of the through holes in the glass or glass ceramic article comprising copper-metallized through holes is greater than or equal to 50 µm and less than or equal to 600 µm.

A sixteenth clause includes a process of any of the preceding clauses, wherein the glass or glass ceramic article comprises at least 90 wt % silica.

A seventeenth clause includes a process, comprising: heating the glass or glass ceramic article comprising copper-metallized through holes from a first temperature to a second temperature, wherein the first temperature is greater than or equal to 240° C. and less than or equal to 260° C., and wherein the second temperature is greater than or equal to 400° C. and less than or equal to 450° C., wherein an average heating rate during the heating of the glass or glass ceramic article comprising copper-metallized through holes from the first temperature to a second temperature is greater than 0.0° C./min and less than or equal to 6.5° C./min.

An eighteenth clause includes a glass or glass ceramic article comprising: a glass or glass ceramic substrate comprising at least one through hole penetrating the glass or glass ceramic substrate in a thickness direction; and copper present in the at least one through hole, wherein the glass or glass ceramic article does not comprise radial cracks after annealing to ≤450° C.

A nineteenth clause includes a glass or glass ceramic article of clause 18, wherein the glass or glass ceramic substrate comprises at least 90 wt % silica.

A twentieth clause includes a glass or glass ceramic article of any one of clauses 18 and 19, wherein a diameter of the at least one hole in the glass or glass ceramic substrate is greater than or equal to 25 µm and less than or equal to 75 µm.

A twenty first clause includes a glass or glass ceramic article of any one of clauses 18 to 20, wherein a pitch of at least one through hole in the glass or glass ceramic article is greater than or equal to 60 µm and less than or equal to 800 µm.

A twenty second clause includes a glass or glass ceramic article of any one of clauses 18 to 21, wherein a depth of at least one through hole in the glass or glass ceramic substrate is greater than or equal to 50 µm and less than or equal to 600 µm.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
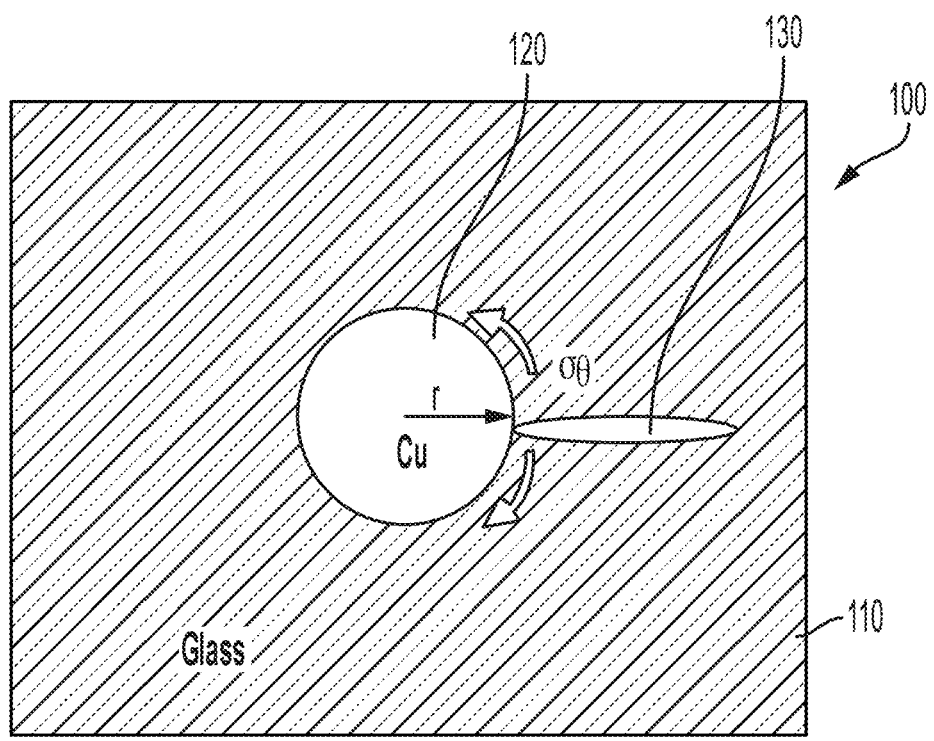
FIG. 1 schematically depicts a top view of a copper-metallized through hole in a glass or glass ceramic substrate that comprises a radial crack.

Many components in electronic devices need electrical conduction through the thickness of the substrate. This is accomplished using an electrically conductive hole typically constructed by fabricating a through-hole in a substrate, such as a glass or glass ceramic substrate, by computer numerical controller (CNC) drilling or laser drilling, and then coating and/or filling the through-hole with an electrically conductive metal such as, for example, copper. In the case of solid filled electrically conducting holes a uniform electrically conducting layer is applied and then electrolytic/galvanic plating is completed until the through-hole is filled. By these methods, a glass or glass ceramic article having copper-metallized through holes is formed. However, many processes require that the glass or glass ceramic article having copper-metallized through holes be heated after copper has been filled into the through holes.

However, when heating a glass or glass ceramic article having copper-metallized through holes, thermo-mechanical challenges arise due to the coefficient of thermal expansion (CTE) mismatch between the glass or glass ceramic matrix and the copper. One thermo-mechanically induced failure mode in glass or glass ceramic, is the formation of radial cracks. Radial cracks are formed during heating or ramp-up step of a heat treatment process. Without being bound by any particular theory, it is believed the radial cracks are formed due to high tensile stresses in the circumferential direction in glass or glass ceramic as a result of CTE mismatch between copper in the through hole and the glass or glass ceramic matrix. This CTE difference leads to high stress buildup that results in different failure modes, such as cracks in glass or glass ceramic, voids, sidewall delamination and much more.

Common practices to prevent the formation of cracks include using better CTE matching glass or glass ceramic compositions, use of annular or conformally plated through holes, lower annealing temperatures (usually <300° C., corresponding to the reflow temperature of lead-free solders), smaller hole sizes, or the use of metallization materials having with lower electrical conductivity than copper, but better CTE matching with the glass or glass ceramic. However, these solutions can limit the application of metallized through-holes. For instance, annular holes and small diameter holes, are not preferred for high current carrying applications, such as power devices, where thick layer of metallization is required. Also, for high frequency applications, high silica content glasses are generally used.

To address the above, and other, issues processes according to embodiments disclosed and described herein comprise heating a glass or glass ceramic article comprising copper-metallized through holes from a first temperature to a second temperature, wherein the first temperature is greater than or equal to 200° C. and less than or equal to 300° C., and wherein the second temperature is greater than or equal to 350° C. and less than or equal to 450° C., wherein an average heating rate during the heating of the glass or glass ceramic article comprising copper-metallized through holes from the first temperature to the second temperature is greater than 0.0° C./min and less than 8.7° C./min. Embodiments also include a glass or glass ceramic article comprising a glass or glass ceramic substrate comprising at least one through hole penetrating the glass or glass ceramic substrate in a thickness direction, and copper present in the at least one through hole, wherein the glass or glass ceramic article does not comprise radial cracks.

As discussed above, and with reference to FIG. 1, embodiments of a glass or glass ceramic article 100 comprise a glass or glass ceramic substrate 110 and a copper-metallized through hole 120. The copper-metallized through hole 120 is cylindrical in shape and comprises a copper metal in at least a portion of the through hole. It should be understood that any through hole geometry can be used according to embodiments disclosed and described herein. Such geometries include, but are not limited to conical through holes, frustoconical through holes, or pinched through holes (e.g., through holes with an hour-glass type shape). The copper-metallized through 120 has a radius "r". The CTE mismatch between the glass or glass ceramic substrate 110 and the CTE of the copper that is present in the through hole may cause the formation of cracks 130 that extend in a radial direction from the copper-metallized through hole 120. These cracks 130 that extend in a radial direction from the copper-metallized through hole 120 are referred to herein as radial cracks. Without being bound by any particular theory, it is believed that as the glass or glass ceramic article 100 comprising copper-metallized through holes is heated the relatively low expansion of the glass or glass ceramic substrate 110 constrains the free expansion of the copper present in the copper-metallized through hole 120, such that high stresses are built up and radial cracks 130 are formed in the glass or glass ceramic substrate 110.

Although embodiments are directed to copper-metallized through holes, it should be understood that the processes disclosed and described herein may be used on through holes that are metallized with any metallic material. In particular, because processes disclosed and described herein are directed to glass and glass ceramic substrates having a CTE mismatch with the material present in a through hole, radial cracks can be minimized or eliminated in glass or glass ceramic substrates having through holes that are metallized with any metal material.

Figure 2:
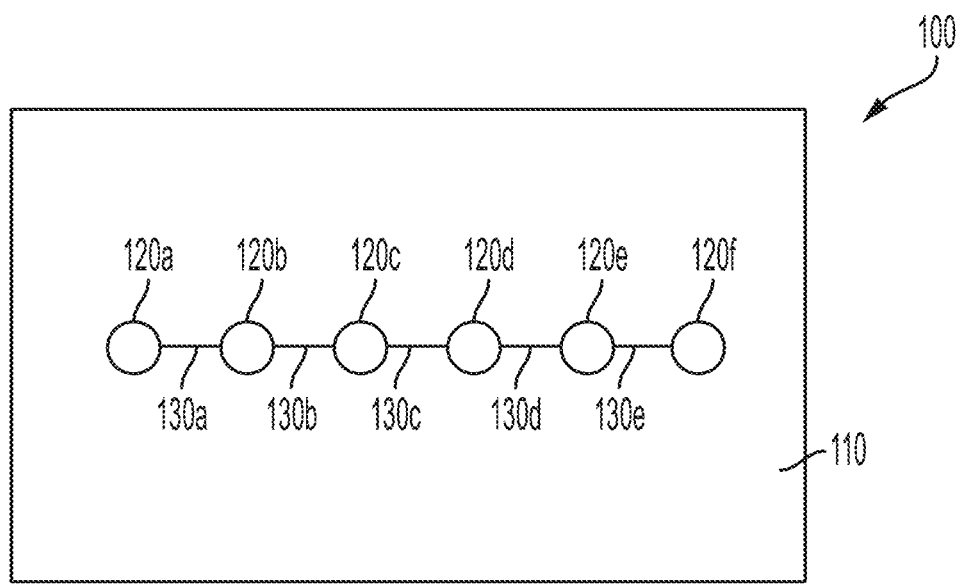
FIG. 2 schematically depicts a top view of a glass or glass ceramic article having a plurality of copper-metallized through holes that comprises radial cracks.

In some embodiments, and with reference now to FIG. 2, the glass or glass ceramic substrate 110 may comprise a plurality of copper-metallized through holes 120a-102f that are positioned along a straight line in the glass or glass ceramic substrate 110. In such a configuration, a plurality of radial cracks 130a-130e may be formed in the glass or glass ceramic substrate 110 such that the radial cracks 130a-130e span the distance between adjacent copper-metallized through holes 120a-120f. For instance, a radial crack 130a may extend between adjacent copper-metallized through holes 120a and 120b and a radial crack 130b may extend between adjacent copper-metallized through holes 120b and 120c. In this way, radial cracks 130a-130e can, span between each of the copper-metallized through holes 120a-120f in the glass or glass ceramic substrate 110.

As mentioned above, stresses present in the glass or glass ceramic article 100 with copper-metallized through holes may cause radial cracks 130 to form upon heating the glass or glass ceramic article 100. These stresses that may cause the radial cracks 130 can be approximated theoretically as shown below and, according to embodiments disclosed and described herein, processes that control the stresses and minimize or eliminate radial cracks in the glass or glass ceramic article 100 with copper-metallized through holes can be developed.

Because the copper-metallized through holes 120 in the glass or glass ceramic substrate 110 are generally cylindrical and are encased by a glass or glass ceramic matrix, the stresses in glass or glass ceramic can be determined using Lame's thick/solid wall cylinder equation, where the in-plane stresses—radial and circumferential stresses—are equal but opposite at the central region of the glass or glass ceramic thickness as shown in equation 1 below:

$$\sigma_r = -\sigma_{248} \tag{1}$$

where $\sigma_r$ is the radial stress and $\sigma_\theta$ is the circumferential (or hoop) stress.

Figure 3:
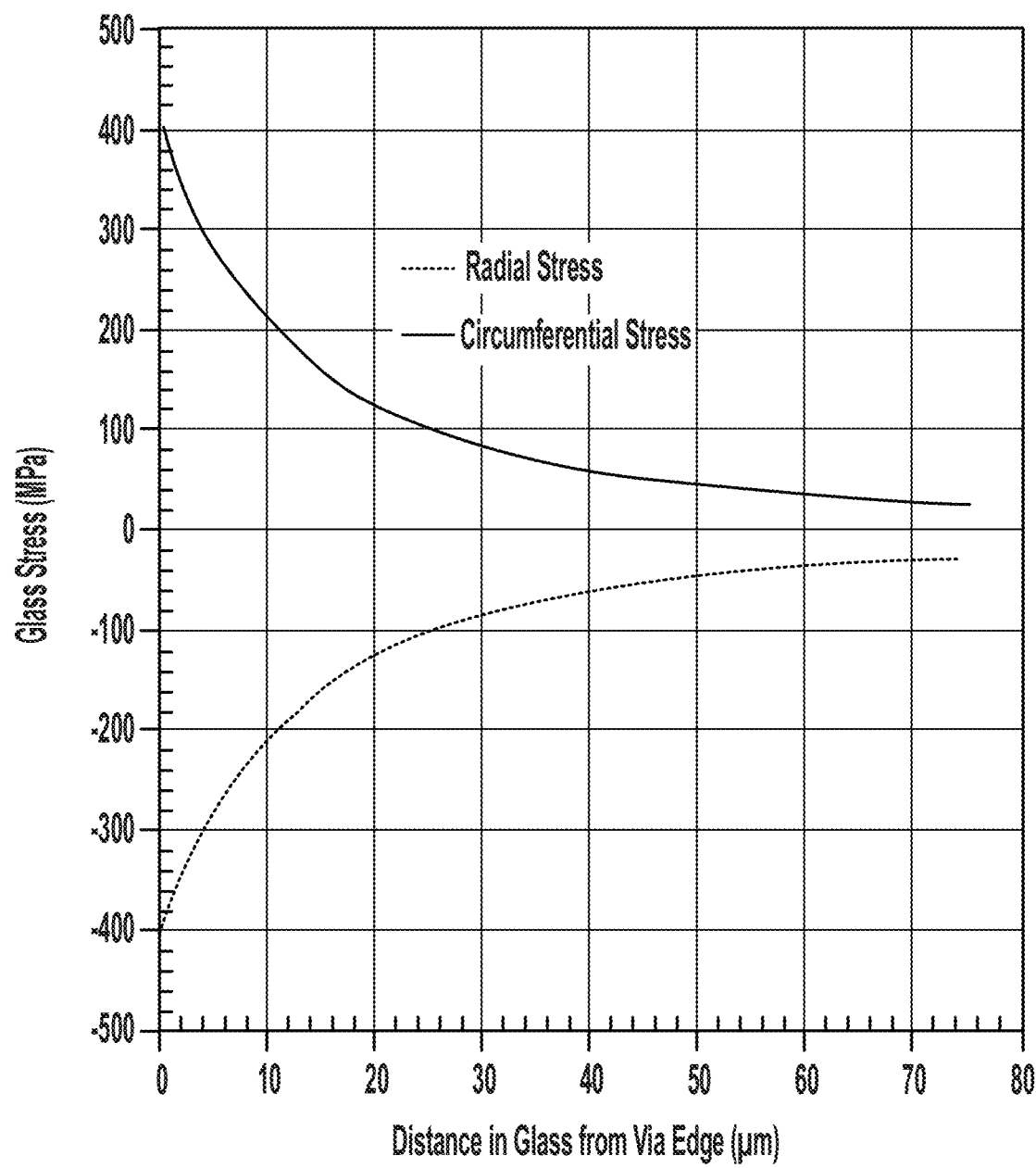
FIG. 3 graphically depicts radial stress and circumferential stress that occur during heating a glass or glass ceramic article comprising copper-metallized through holes.

The in-plane thermo-mechanical stresses in glass or glass ceramic surrounding a single copper via can be calculated using equation 2 below with exemplary values that follow:

$$\sigma_r = -\sigma_\theta = \left[ \frac{-E_{Cu}(\alpha_{Cu} - \alpha_{glass})\Delta T}{(1 - 2v_{Cu}) + \left(\frac{1 + v_{glass}}{1 + v_{Cu}}\right)\left(\frac{E_{Cu}}{E_{glass}}\right)} \left(\frac{D_{Cu}}{2r}\right)^2 \right] \quad (2)$$

where $\alpha_{Cu}$ is the CTE for copper (16.7 ppm/° C.); $\alpha_{glass}$ is the CTE of glass or glass ceramic (0.6 ppm/° C.); $v_{glass}$ and $v_{Cu}$ are the Poisson ratios for the glass or glass ceramic (0.26) and copper (0.35), respectively; r is the distance in glass or glass ceramic from the center of the hole. This means that at the interface between the glass or glass ceramic substrate and the copper, r is the radius of the metallized through hole. $D_{Cu}$ is the diameter of the through hole (50 μm); $E_{Cu}$ and $E_{glass}$ are the elastic modulus of copper (120 GPa) and the glass or glass ceramic (70 GPa), respectively; and $\Delta T$ is the change in temperature. Using equation 2 and the values provided above for copper and glass or glass ceramic, the stress in a glass or glass ceramic substrate during heating from room temperature (about 25° C.) to a maximum temperature can be calculate; where copper and glass or glass ceramic are assumed to be elastic materials. The calculated glass or glass ceramic stresses from the through hole edge is presented in FIG. 3, where it is shown that the circumferential and the radial stresses are equal in magnitude but opposite in direction. In FIG. 3, the tensile circumferential stress in glass or glass ceramic is expected to be a primary cause for the formation of radial cracks during heating, as cracks are known to form due to tensile stress field. The maximum stresses occur at the edge of the via, which exponentially decays away from the through hole edge, where the through hole is not closely adjacent to another through hole.

Figure 4:
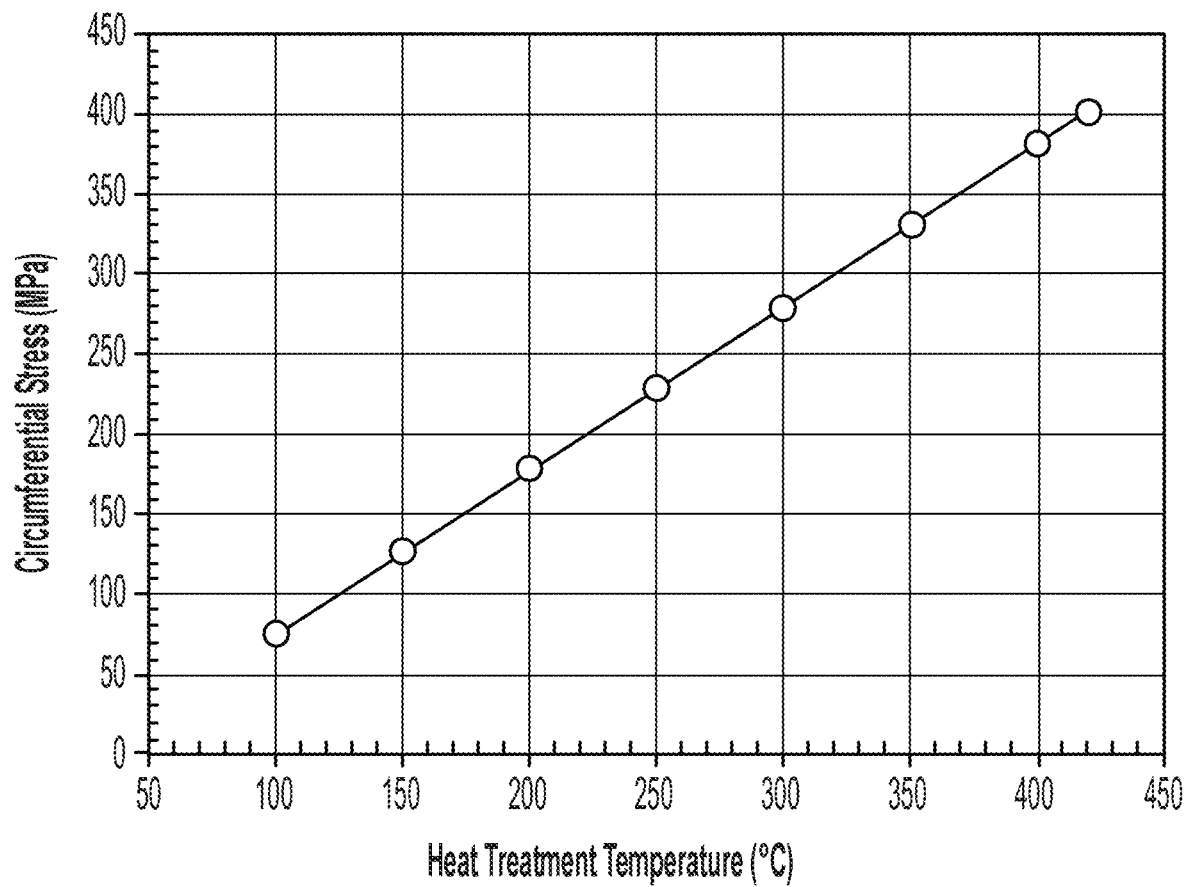
FIG. 4 graphically depicts circumferential stress versus heat treatment temperature for heating a glass or glass ceramic article comprising copper-metallized through holes.

Equation 2 above can be used to determine the maximum tensile circumferential stress value as a function of temperature. FIG. 4 shows a plot of heat treatment temperature (° C.) versus circumferential stress (MPa). The plot in FIG. 4 shows that an increase in the temperature during a heat treatment results in an essentially linear increase in circumferential stress, which shows that the probability for forming radial cracks increases as the temperature of a heat treatment increases. Thus, at higher temperatures, radial cracks are more likely to occur.

Using the above equations and analysis, processes for heating glass or glass ceramic articles comprising copper-metallized through holes according to embodiments disclosed and described herein were formulated that minimize or eliminate the formation of radial cracks in glass or glass ceramic articles comprising copper-metallized through holes. Without being bound by any particular theory, it is believed that using a low average heating rate during high-temperature portions of the heat treatment allows for stress relaxation mechanisms to activate which minimizes the effects of the higher circumferential stress present at high temperatures, thereby reducing or eliminating the formation of radial cracks in the glass or glass ceramic article comprising copper-metallized through holes.

Processes for heating glass or glass ceramic articles comprising copper-metallized through holes according to embodiments will now be described. As mentioned above, using Equation 2, it was determined that circumferential stress in glass or glass ceramic articles comprising copper-metallized through holes—which may lead to the formation of radial cracks—increases as heat treatment temperatures increase. Accordingly, it was determined that in processes for heating glass or glass ceramic articles comprising copper-metalized through holes according to embodiments, there is a first temperature at which the probability of radial crack formation becomes significant, and the average heating rate above this first temperature is controlled to be a low average heating rate, thereby reducing or minimizing the formation of radial cracks. According to some embodiments, the heating rate at temperatures below this first temperature does not need to be limited. Thus, the glass or glass ceramic article comprising copper-metallized through holes can be heated to the first temperature using any average heating rate. Therefore, embodiments of processes for heating glass or glass ceramic articles comprising copper-metallized through holes are directed to controlling the average heating rate during the process where the temperature of the glass or glass ceramic article comprising the copper-metallized through holes is greater than or equal to the first temperature and less than or equal to a second temperature where heat treatments are usually concluded. It should be understood that the temperatures disclosed herein refer to the measured atmospheric temperature of the device used to heat the glass or glass ceramic article comprising copper-metallized through holes, such as an oven, furnace, kiln, lehr, or the like.

Using this information, heat treatments were conducted on glass or glass ceramic articles comprising copper-metallized through holes to determine the temperature at which radial cracks form. Through visual observation of the various heat treatments, it was found that the probability that radial cracks will form significantly increases at temperatures greater than or equal to 200° C., such as at temperatures greater than or equal to 210° C., temperatures greater than or equal to 220° C., temperatures greater than or equal to 230° C., temperatures greater than or equal to 240° C., temperatures greater than or equal to 250° C., temperatures greater than or equal to 260° C., temperatures greater than or equal to 270° C., temperatures greater than or equal to 280° C., or temperatures greater than or equal to 290° C. Accordingly, in processes for heating a glass or glass ceramic article comprising copper-metallized through holes according to embodiments, the heating rate at temperatures below the first temperature do not need to be controlled because the probability of radial crack formation at temperatures below the first temperature is low. In embodiments, the first temperature is greater than or equal to 200° C. and less than or equal to 300° C., such as greater than or equal to 210° C. and less than or equal to 300° C., greater than or equal to 220° C. and less than or equal to 300° C., greater than or equal to 230° C. and less than or equal to 300° C., greater than or equal to 240° C. and less than or equal to 300° C., greater than or equal to 250° C. and less than or equal to 300° C., greater than or equal to 260° C. and less than or equal to 300° C., greater than or equal to 270° C. and less than or equal to 300° C., greater than or equal to 280° C. and less than or equal to 300° C., or greater than or equal to 290° C. and less than or equal to 300° C. In some embodiments, the first temperature is greater than or equal to 200° C. and less than or equal to 290° C., such as greater than or equal to 200° C. and less than or equal to 280° C., greater than or equal to 200° C. and less than or equal to 270° C., greater than or equal to 200° C. and less than or equal to 260° C., greater than or equal to 200° C. and less than or equal to 250° C., greater than or equal to 200° C. and less than or equal to 240° C., greater than or equal to 200° C. and less than or equal to 230° C., greater than or equal to 200° C. and less than or equal to 220° C., or greater than or equal to 200° C. and less than or equal to 210° C. In some embodiments, the first temperature is greater than or equal to 220° C. and less than or equal to 280° C., such as greater than or equal to 225°

C. and less than or equal to 275° C., or greater than or equal to 240° C. and less than or equal to 260° C.

The probability for radial crack formation in glass or glass ceramic articles having copper-metallized through holes is high from the first temperature, which are mentioned above, to a second temperature where heat treatments generally are concluded. In embodiments, the second temperature is greater than or equal to 350° C. and less than or equal to 450° C., such as greater than or equal to 360° C. and less than or equal to 450° C., greater than or equal to 370° C. and less than or equal to 450° C., greater than or equal to 380° C. and less than or equal to 450° C., greater than or equal to 390° C. and less than or equal to 450° C., greater than or equal to 400° C. and less than or equal to 450° C., greater than or equal to 410° C. and less than or equal to 450° C., greater than or equal to 420° C. and less than or equal to 450° C., greater than or equal to 430° C. and less than or equal to 450° C., or greater than or equal to 440° C. and less than or equal to 450° C. In some embodiments, the second temperature is greater than or equal to 350° C. and less than or equal to 440° C., such as greater than or equal to 350° C. and less than or equal to 430° C., greater than or equal to 350° C. and less than or equal to 420° C., greater than or equal to 350° C. and less than or equal to 410° C., greater than or equal to 350° C. and less than or equal to 400° C., greater than or equal to 350° C. and less than or equal to 390° C., greater than or equal to 350° C. and less than or equal to 380° C., greater than or equal to 350° C. and less than or equal to 370° C., or greater than or equal to 350° C. and less than or equal to 360° C. In embodiments the second temperature is greater than or equal to 375° C. and less than or equal to 450° C., such as greater than or equal to 375° C. to less than or equal to 425° C.

As mentioned above, processes for heating glass or glass ceramic articles comprising copper-metallized through holes according to embodiments disclosed and described herein control the average heating rate when the glass or glass ceramic article comprising copper-metallized through holes is at temperatures greater than or equal to the first temperature and less than or equal to the second temperature—where the probability for crack formation is high. As used herein, the average heating rate is the difference between the second temperature and the first temperature divided by the amount of time it takes to heat the glass or glass ceramic article comprising copper-metallized through holes from the first temperature to the second temperature. Thus, the average heating rate, as used herein, includes any temperature holds where the glass or glass ceramic article comprising copper-metallized through holes is at a temperature greater than or equal to the first temperature and less than or equal to the second temperature. As an example, if a glass or glass ceramic article comprising copper-metallized through holes is heated from a first temperature of 300° C. to 350° C. in 10 minutes, held at 350° C. for 10 minutes and then heated from 350° C. to the second temperature of 400° C. in 10 minutes, the average heating rate is 3.33° C./min $$\left(i.e., \frac{400°\ C.-300°\ C.}{30\ min}\right).$$

In embodiments, the average heating rate from the first temperature to the second temperature is greater than 0.0° C./min and less than 8.7° C./min, such as greater than 0.0° C./min and less than or equal to 8.5° C./min, greater than 0.0° C./min and less than or equal to 8.2° C./min, greater than 0.0° C./min and less than or equal to 8.0° C./min, greater than 0.0° C./min and less than or equal to 7.8° C./min, greater than 0.0° C./min and less than or equal to 7.5° C./min, greater than 0.0° C./min and less than or equal to 7.2° C./min, greater than 0.0° C./min and less than or equal to 7.0° C./min, greater than 0.0° C./min and less than or equal to 6.8° C./min, greater than 0.0° C./min and less than or equal to 6.5° C./min, greater than 0.0° C./min and less than or equal to 6.2° C./min, greater than 0.0° C./min and less than or equal to 6.0° C./min, greater than 0.0° C./min and less than or equal to 5.8° C./min, greater than 0.0° C./min and less than or equal to 5.5° C./min, greater than 0.0° C./min and less than or equal to 5.2° C./min, or greater than 0.0° C./min and less than or equal to 5.0° C./min. In some embodiments, the average heating rate from the first temperature to the second temperature is greater than or equal to 2.0° C./min and less than 8.7° C./min, such as greater than or equal to 2.2° C./min and less than 8.7° C./min, greater than or equal to 2.5° C./min and less than 8.7° C./min, greater than or equal to 2.8° C./min and less than 8.7° C./min, greater than or equal to 2.8° C./min and less than 8.7° C./min, greater than or equal to 3.0° C./min and less than 8.7° C./min. In embodiments, the average heating rate from the first temperature to the second temperature is greater than or equal to 2.0° C./min and less than or equal to 6.5° C./min, such as greater than or equal to 2.2° C./min and less than or equal to 6.5° C./min, greater than or equal to 2.5° C./min and less than or equal to 6.5° C./min, greater than or equal to 2.8° C./min and less than or equal to 6.5° C./min, or greater than or equal to 3.0° C./min and less than 6.5° C./min. Heating of the glass or glass ceramic article comprising copper-metallized through holes from the first temperature to the second temperature at the above average heating rates does not cause radial cracks in the glass or glass ceramic article comprising copper-metallized through holes.

According to some embodiments, the heating rate from the first temperature to the second temperature is kept substantially constant such that a uniform heating rate is used in the entire temperature range from the first temperature to the second temperature. As used herein, a substantially constant heating rate refers to a heating rate that is maintained as close the heating rate set point as can be controlled by the device used to heat the glass or glass ceramic article comprising the copper-metallized through holes. For instance, it may be determined that the heating rate in a temperature range from the first temperature to the second temperature should be constant and set at 6.5° C./min. However, given inherent inconsistencies and inefficiencies in the device used to heat the glass or glass ceramic article comprising copper-metallized through holes, the heating rate may decrease to, for example, 6.2° C./min or increase to, for example 6.8° C./min even though the heating rate is intended to be constant at 6.5° C./min. As used herein, this situation would be a "substantially constant" heating rate. In some embodiments, the heating rate from the first temperature to the second temperature may be variable. As used herein, a "variable" heating rate refers to a heating rate that is intentionally changed in a temperature range from the first temperature to the second temperature. An example of an embodiment having a variable heating rate would be where the glass or glass ceramic article comprising copper-metallized through holes is heated from the first temperature of 300° C. to a temperature of 350° C. at a heating rate of 6.5° C./min and then intentionally heated from 350° C. to a second temperature of 400° C. at a heating rate of 2.3° C./min.

Although, in embodiments, the average heating rate where the glass or glass ceramic article comprising copper-metallized through holes is at a temperature from room temperature (about 25° C.) to the first temperature is not limited, in some embodiments the average heating rate the average heating rate where the glass or glass ceramic article comprising copper-metallized through holes is at a temperature from room temperature (about 25° C.) to the first temperature is also kept low to help ensure that radial cracks do not form. Accordingly, in embodiments, the average heating rate from room temperature to the first temperature is greater than 0.0° C./min and less than 8.7° C./min, such as greater than 0.0° C./min and less than or equal to 8.5° C./min, greater than 0.0° C./min and less than or equal to 8.2° C./min, greater than 0.0° C./min and less than or equal to 8.0° C./min, greater than 0.0° C./min and less than or equal to 7.8° C./min, greater than 0.0° C./min and less than or equal to 7.5° C./min, greater than 0.0° C./min and less than or equal to 7.2° C./min, greater than 0.0° C./min and less than or equal to 7.0° C./min, greater than 0.0° C./min and less than or equal to 6.8° C./min, greater than 0.0° C./min and less than or equal to 6.5° C./min, greater than 0.0° C./min and less than or equal to 6.2° C./min, greater than 0.0° C./min and less than or equal to 6.0° C./min, greater than 0.0° C./min and less than or equal to 5.8° C./min, greater than 0.0° C./min and less than or equal to 5.5° C./min, greater than 0.0° C./min and less than or equal to 5.2° C./min, or greater than 0.0° C./min and less than or equal to 5.0° C./min. In some embodiments, the average heating rate from room temperature to the first temperature is greater than or equal to 1.0° C./min and less than 8.7° C./min, such as greater than or equal to 2.0° C./min and less than 8.7° C./min, greater than or equal to 2.5° C./min and less than 8.7° C./min, greater than or equal to 2.8° C./min and less than 8.7° C./min, greater than or equal to 2.8° C./min and less than 8.7° C./min, greater than or equal to 3.0° C./min and less than 8.7° C./min. In embodiments, the average heating rate from room temperature to the first temperature is greater than or equal to 1.0° C./min and less than or equal to 6.5° C./min, such as greater than or equal to 2.0° C./min and less than or equal to 6.5° C./min, greater than or equal to 2.2° C./min and less than 6.5° C./min, greater than or equal to 2.5° C./min and less than 6.5° C./min, greater than or equal to 2.7° C./min and less than 6.5° C./min, or greater than or equal to 3.0° C./min and less than 6.5° C./min.

As mentioned above, processes for heating a glass or glass ceramic article comprising copper-metallized through holes from the first temperature to the second temperature may include various temperature holds, where the temperature is held constant for a period of time. Without being bound to any particular theory, it is believed that by holding the glass or glass ceramic article comprising copper-metallized through holes at a constant temperature, relaxation occurs during the temperature hold, and the stress in the glass or glass ceramic article comprising copper-metallized through holes may decrease. Accordingly, if a temperature hold is conducted before crack formation occurs, relaxation resulting from the temperature hold may reduce the stresses in the glass or glass ceramic article comprising copper-metallized through holes enough that there is no crack formation. In addition, temperature holds may be used at one or more of the first temperature and the second temperature to allow the stresses in the glass or glass ceramic article comprising copper-metallized through holes to relax.

In embodiments, the glass or glass ceramic article comprising copper-metallized through holes may be held at the first temperature for a duration greater than or equal to ten (10) minutes and less than or equal to 120 minutes, such as greater than or equal to fifteen (15) minutes and less than or equal to 120 minutes, greater than or equal to thirty (30) minutes and less than or equal to 120 minutes, greater than or equal to forty five (45) minutes and less than or equal to 120 minutes, greater than or equal to sixty (60) minutes and less than or equal to 120 minutes, greater than or equal to seventy five (75) minutes and less than or equal to 120 minutes, greater than or equal to ninety (90) minutes and less than or equal to 120 minutes, or greater than or equal to forty 105 minutes and less than or equal to 120 minutes. In embodiments, the glass or glass ceramic article comprising copper-metallized through holes may be held at the first temperature for a duration greater than or equal to ten (10) minutes and less than or equal to 105 minutes, such as greater than or equal to ten (10) minutes and less than or equal to ninety (90) minutes, greater than or equal to ten (10) minutes and less than or equal to seventy five (75) minutes, greater than or equal to ten (10) minutes and less than or equal to sixty (60) minutes, greater than or equal to ten (10) minutes and less than or equal to forty five (45) minutes, greater than or equal to ten (10) minutes and less than or equal to thirty (30) minutes, or greater than or equal to ten (10) minutes and less than or equal to fifteen (15) minutes.

In embodiments, the glass or glass ceramic article comprising copper-metallized through holes may be held at the second temperature for a duration greater than or equal to ten (10) minutes and less than or equal to 120 minutes, such as greater than or equal to fifteen (15) minutes and less than or equal to 120 minutes, greater than or equal to thirty (30) minutes and less than or equal to 120 minutes, greater than or equal to forty five (45) minutes and less than or equal to 120 minutes, greater than or equal to sixty (60) minutes and less than or equal to 120 minutes, greater than or equal to seventy five (75) minutes and less than or equal to 120 minutes, greater than or equal to ninety (90) minutes and less than or equal to 120 minutes, or greater than or equal to forty 105 minutes and less than or equal to 120 minutes. In embodiments, the glass or glass ceramic article comprising copper-metallized through holes may be held at the second temperature for a duration greater than or equal to ten (10) minutes and less than or equal to 105 minutes, such as greater than or equal to ten (10) minutes and less than or equal to ninety (90) minutes, greater than or equal to ten (10) minutes and less than or equal to seventy five (75) minutes, greater than or equal to ten (10) minutes and less than or equal to sixty (60) minutes, greater than or equal to ten (10) minutes and less than or equal to forty five (45) minutes, greater than or equal to ten (10) minutes and less than or equal to thirty (30) minutes, or greater than or equal to ten (10) minutes and less than or equal to fifteen (15) minutes.

In embodiments, the glass or glass ceramic article comprising copper-metallized through holes may be held at a constant temperature between the first temperature and the second temperature for a duration greater than or equal to ten (10) minutes and less than or equal to 120 minutes, such as greater than or equal to fifteen (15) minutes and less than or equal to 120 minutes, greater than or equal to thirty (30) minutes and less than or equal to 120 minutes, greater than or equal to forty five (45) minutes and less than or equal to 120 minutes, greater than or equal to sixty (60) minutes and less than or equal to 120 minutes, greater than or equal to seventy five (75) minutes and less than or equal to 120 minutes, greater than or equal to ninety (90) minutes and less than or equal to 120 minutes, or greater than or equal to forty 105 minutes and less than or equal to 120 minutes. In embodiments, the glass or glass ceramic article comprising copper-metallized through holes may be held at a constant temperature between the first temperature and the second temperature for a duration greater than or equal to ten (10) minutes and less than or equal to 105 minutes, such as greater than or equal to ten (10) minutes and less than or equal to ninety (90) minutes, greater than or equal to ten (10) minutes and less than or equal to seventy five (75) minutes, greater than or equal to ten (10) minutes and less than or equal to sixty (60) minutes, greater than or equal to ten (10) minutes and less than or equal to forty five (45) minutes, greater than or equal to ten (10) minutes and less than or equal to thirty (30) minutes, or greater than or equal to ten (10) minutes and less than or equal to fifteen (15) minutes.

Although processes disclosed herein may be used on glass or glass ceramic articles comprising any sized copper-metallized through holes, the processes disclosed herein may be particularly suitable for use on glass or glass ceramic articles comprising relatively small copper-metallized through holes. In embodiments, the copper-metallized through holes may have a diameter greater than or equal to 25 μm and less than or equal to 75 μm, such as greater than or equal to 30 μm and less than or equal to 70 μm, greater than or equal to 35 μm and less than or equal to 70 μm, greater than or equal to 40 μm and less than or equal to 70 μm, greater than or equal to 45 μm and less than or equal to 70 μm, greater than or equal to 50 μm and less than or equal to 70 μm, greater than or equal to 55 μm and less than or equal to 70 μm, greater than or equal to 60 μm and less than or equal to 70 μm, or greater than or equal to 65 μm and less than or equal to 70 μm. In embodiments, the copper-metallized through holes may have a diameter greater than or equal to 25 μm and less than or equal to 65 μm, such as greater than or equal to 25 μm and less than or equal to 60 μm, greater than or equal to 25 μm and less than or equal to 55 μm, greater than or equal to 25 μm and less than or equal to 50 μm, greater than or equal to 25 μm and less than or equal to 45 μm, greater than or equal to 25 μm and less than or equal to 40 μm, greater than or equal to 25 μm and less than or equal to 35 μm, or greater than or equal to 25 μm and less than or equal to 30 μm. In embodiments, the copper-metallized through holes may have a diameter greater than or equal to 35 μm and less than or equal to 65 μm, such as greater than or equal to 40 μm and less than or equal to 60 μm.

It should be understood that the processes disclosed and described herein may be used with through holes having any pitch. Specifically, by heating glass or glass ceramic articles according to embodiments disclosed and described herein, radial cracking can be minimized or eliminated regardless of the pitch of the through holes. Further, the pitch of the through holes will depend on the diameter of the through holes in the substrate. However, in some embodiments, where the diameter of the through holes is about 50 μm, the copper-metallized through holes may have a pitch greater than or equal to 60 μm and less than or equal to 800 μm, such as greater than or equal to 100 μm and less than or equal to 750 μm, greater than or equal to 150 μm and less than or equal to 700 μm, greater than or equal to 200 μm and less than or equal to 650 μm, greater than or equal to 250 μm and less than or equal to 600 μm, greater than or equal to 300 μm and less than or equal to 550 μm, greater than or equal to 350 μm and less than or equal to 500 μm, or greater than or equal to 400 μm and less than or equal to 450 μm. In embodiments, the copper-metallized through holes may have a pitch greater than or equal to 60 μm and less than or equal to 140 μm, such as greater than or equal to 60 μm and less than or equal to 130 μm, greater than or equal to 60 μm and less than or equal to 120 μm, greater than or equal to 60 μm and less than or equal to 110 μm, greater than or equal to 60 μm and less than or equal to 100 μm, greater than or equal to 60 μm and less than or equal to 90 μm, greater than or equal to 60 μm and less than or equal to 80 μm, or greater than or equal to 60 μm and less than or equal to 70 μm.

It should be understood that the processes disclosed and described herein may be used with through holes having any depth. Specifically, by heating glass or glass ceramic articles according to embodiments disclosed and described herein, radial cracking can be minimized or eliminated regardless of the depth of the through holes. However, in some embodiments, the copper-metallized through holes may have a depth greater than or equal to 50 μm and less than or equal to 600 μm, such as greater than or equal to 75 μm and less than or equal to 575 μm, greater than or equal to 100 μm and less than or equal to 550 μm, greater than or equal to 125 μm and less than or equal to 525 μm, greater than or equal to 150 μm and less than or equal to 500 μm, greater than or equal to 175 μm and less than or equal to 475 μm, greater than or equal to 200 μm and less than or equal to 450 μm, greater than or equal to 225 μm and less than or equal to 425 μm, greater than or equal to 250 μm and less than or equal to 400 μm, greater than or equal to 275 μm and less than or equal to 375 μm, or greater than or equal to 300 μm and less than or equal to 350 μm. In embodiments, the copper-metallized through holes may have a depth greater than or equal to 200 μm and less than or equal to 400 μm, such as greater than or equal to 200 μm and less than or equal to 375 μm, greater than or equal to 200 μm and less than or equal to 350 μm, greater than or equal to 200 μm and less than or equal to 325 μm, greater than or equal to 200 μm and less than or equal to 300 μm, greater than or equal to 200 μm and less than or equal to 275 μm, greater than or equal to 200 μm and less than or equal to 250 μm, or greater than or equal to 200 μm and less than or equal to 225 μm.

Any glass or glass ceramic material may be used as the glass or glass ceramic substrate of the glass or glass ceramic article comprising copper-metallized through holes according to embodiments disclosed and described herein. Specifically, by heating glass or glass ceramic articles according to embodiments disclosed and described herein, radial cracking can be minimized or eliminated regardless of the composition of the glass or glass ceramic. However, as referred to above, the processes of embodiments are particularly useful when the glass or glass ceramic material used as the glass or glass ceramic substrate of the glass or glass ceramic article comprising copper-metallized through holes has a high CTE mismatch with the CTE of copper. Accordingly, in some embodiments, the glass or glass ceramic substrate of the glass or glass ceramic article comprising copper-metallized through holes comprises high amounts of silica. In some embodiments, the substrate comprises greater than or equal to 50 mol % silica, such as greater than or equal to 55 mol % silica, greater than or equal to 60 mol % silica, greater than or equal to 65 mol % silica, greater than or equal to 70 mol % silica, greater than or equal to 75 mol % silica, greater than or equal to 80 mol % silica, greater than or equal to 85 mol % silica, greater than or equal to 90 mol % silica, greater than or equal to 95 mol % silica, or about 100 mol % silica. In embodiments, the substrate comprises at least 90 wt % silica.

Glass or glass ceramic articles comprising copper-metallized through holes made according to processes disclosed and described herein may be free of radial cracks after the heat treatment when viewed at 50× magnification or more.

Example

Embodiments will be further clarified by the following example.

Figure 5A:
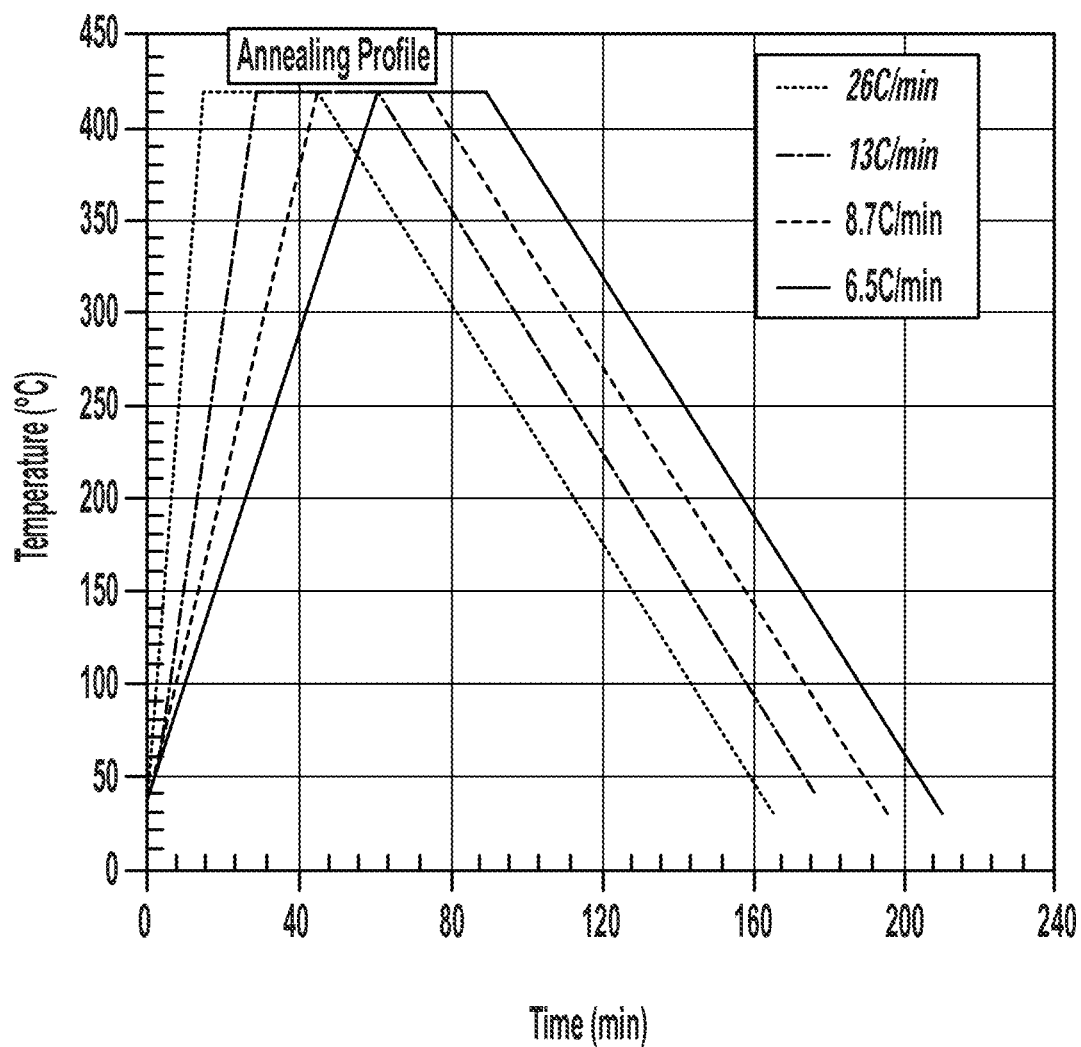
FIG. 5A graphically depicts substantially constant heating rates in temperature versus time for heating a glass or glass ceramic article comprising copper-metallized through holes.
Figure 5B:
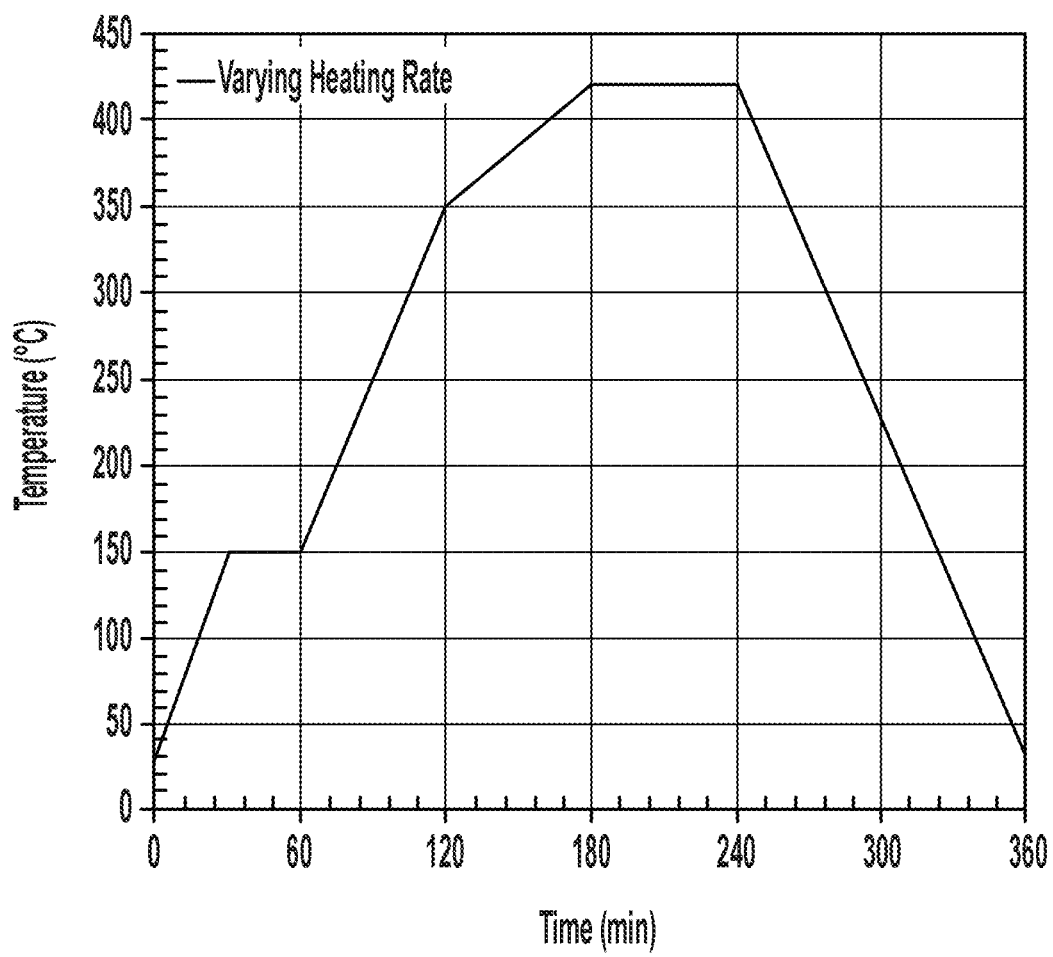
FIG. 5B graphically depicts variable heating rates in temperature versus time for heating a glass or glass ceramic article comprising copper-metallized through holes.

A fully filled cylindrical bottom-up electroplated copper-metallized through holes in a glass substrate comprising at least 90 wt % silica was used. After the filling the through holes with copper by bottom-up electroplating, chemical-mechanical-polishing (CMP) was used to remove copper overburden. Thereafter the substrate was diced into die size of 14 mm by 14 mm, resulting in a die area of 196 mm². Each die contained four columns of copper-metallized through hole arrays, with a total of 952 copper-metallized through holes. The copper-metallized through hole diameter, pitch and depth were 50 μm, 100 μm and 300 μm respectively. The samples were then subjected to annealing treatments using different heating rates to a maximum temperature of 420° C. before the sample was oven cooled to room temperature (about 25° C.). FIG. 5A graphically depicts the annealing profile of four samples having substantially constant heating rates at 6.5° C./min, 8.7° C./min, 13.0° C./min, and 26.0° C./min. FIG. 5B graphically depicts the annealing profile having a variable heating rate, with an average heating rate of 2.3° C./min. Accordingly, heating rates from 2.3° C./min to 26.0° C./min were studied and their full details are presented in Table 1.

TABLE 1

| Total Heating Time to 420° C. (min) | Average Heating Rate (° C./min) | Constant or Variable Heating Rate | Annealing Environment. |
|---|---|---|---|
| 15 | 26.0 | Constant | Air |
| 30 | 13.0 | Constant | Air |
| 45 | 8.7 | Constant | Air |
| 60 | 6.5 | Constant | Air |
| 180 | 2.3 | Variable | Vacuum |

A constant temperature hold for a duration of 30 min at 420° C. was used for all test conditions with the exception of the test condition having an average heating rate of 2.3° C./min, which had a constant temperature hold for a duration of 60 min. The cooling, which is achieved by oven cooling was not varied and took about 120 min.

After the annealing treatment, optical inspection of the dies was performed to determine the dependence of ramp-rate on radial crack formation. The number of cracks on a die for the different ramp-up rates was counted and the crack density for each test condition was calculated using Equation 3. The cracks were observed by optical microscope at 50× to 500× magnification. One sample was used for the study of each heating rate.

$$\text{Crack Density} = \frac{\text{Number of Cracks}}{\text{Die Area}} \quad (3)$$

In order to determine the temperature at which cracks are initiated, an in-situ temperature-dependent study was performed. In this study the sample was heated up to 420° C. at a ramp-rate of 20.5° C./min. By using an in-situ imaging system, images of the same particular set of vias were acquired as a function of temperature every 10 seconds, which were later analyzed to determine the temperature at which cracks were initiated.

Additionally, Zygo topography measurement method was used determine how much copper protrusion occurred with respect to the used annealing heating rate. Based on this measurement, the height of the protruding copper was determined.

Figure 6:
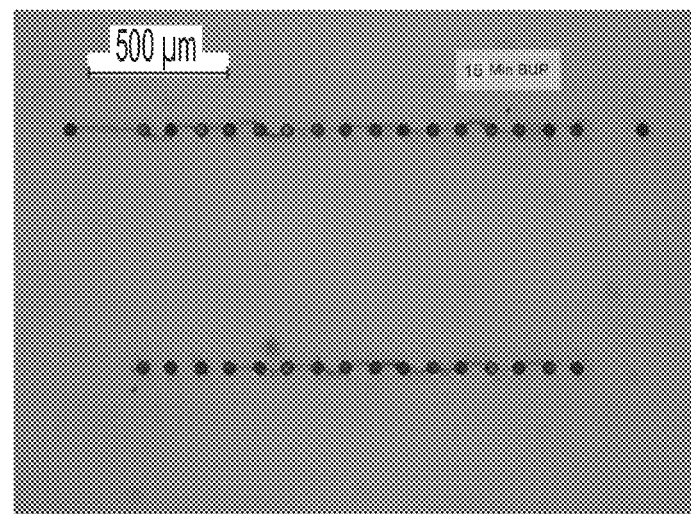
FIG. 6 is a magnified photograph of a glass or glass ceramic article comprising copper-metallized through holes with radial cracks when heated at a substantially constant heating rate of 26.0° C./min.

FIG. 6 presents a 50× optical image of a sample having a heating/ramp-up rate of 26.0° C./min. It was observed that using this fast heating rate results in the formation of cracks in the sample. The radial cracks are shown to form crack chains all through the sample, as they were found to link up with cracks from the adjacent copper-metallized through holes, leading to a network of radial cracks. The total number of radial cracks on the 14 mm by 14 mm die was 375 cracks; yielding a crack density of 1.91 cracks/mm².

Figure 7A:
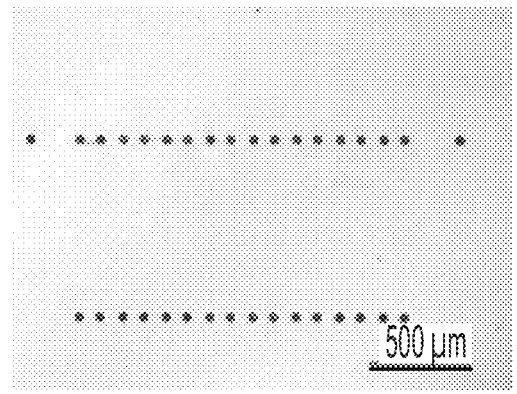
FIG. 7A is a 50× magnified photograph of a glass or glass ceramic article comprising copper-metallized through holes with radial cracks when heated at a substantially constant heating rate of 13.0° C./min.
Figure 7B:
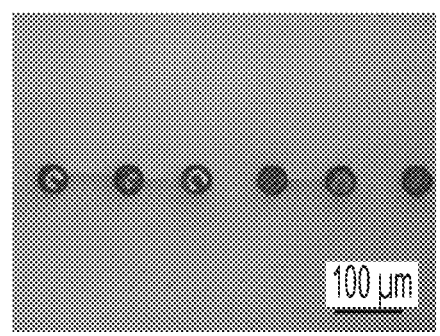
FIG. 7B is a 200× magnified photograph of a glass or glass ceramic article comprising copper-metallized through holes with radial cracks when heated at a substantially constant heating rate of 13.0° C./min.
Figure 8A:
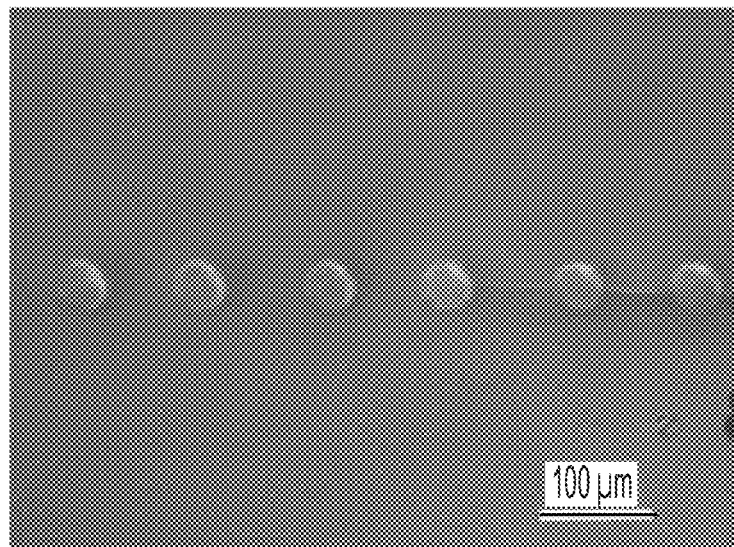
FIG. 8A is a 50× magnified photograph of a glass or glass ceramic article comprising copper-metallized through holes with radial cracks when heated at a substantially constant heating rate of 8.7° C./min.
Figure 8B:
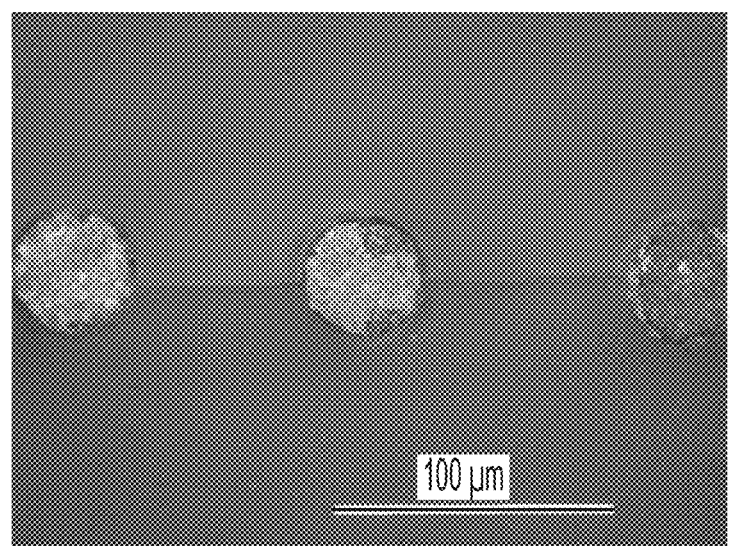
FIG. 8B is a 500× magnified photograph of a glass or glass ceramic article comprising copper-metallized through holes with radial cracks when heated at a substantially constant heating rate of 8.7° C./min.

Slowing the heating rate to 13.0° C./min and 8.7° C./min continued to result in the formation of radial cracks. The cracks formed at a heating rate of 13.0° C./min are shown in FIG. 7A (50×) and FIG. 7B (200×). The cracks formed at a heating rate of 8.7° C./min are shown in FIG. 8A (50×) and FIG. 8B (500×). However, a significant continual drop in the number of cracks was observed. The total number of radial cracks for the 13.0° C./min heating rate was found to be only 8 cracks, and the total number of cracks for the 8.7° C./min heating rate was only 4 cracks; yielded densities of 0.04 cracks/mm² and 0.02 cracks/mm², respectively.

Figure 9A:
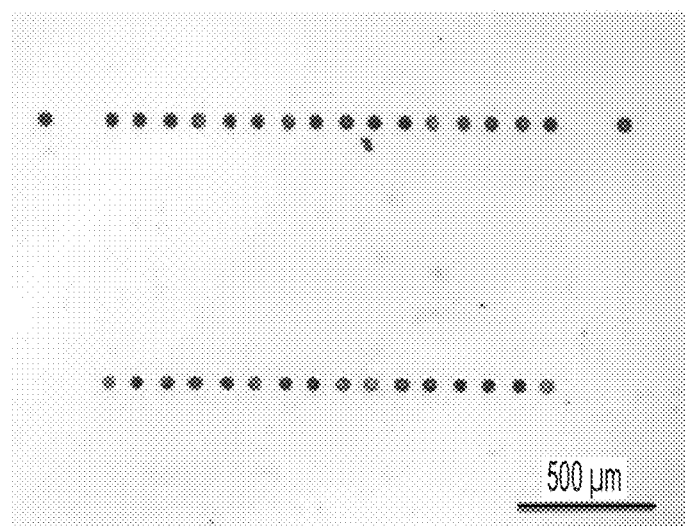
FIG. 9A is a 50× magnified photograph of a glass or glass ceramic article comprising copper-metallized through holes with no radial cracks when heated at a heating rate of 6.5° C./min according to embodiments disclosed and described herein.
Figure 9B:
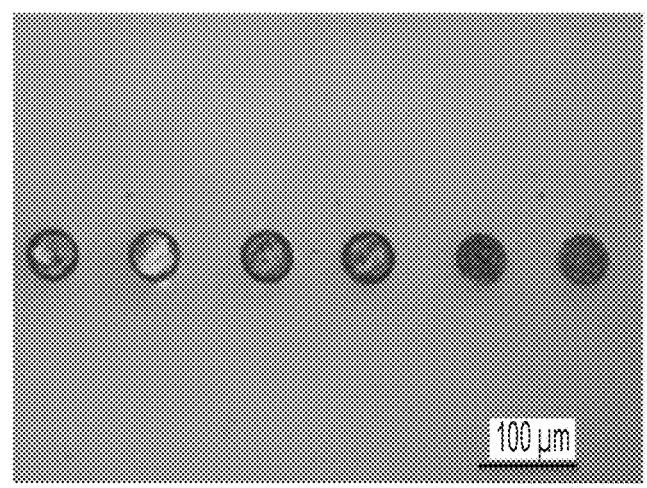
FIG. 9B is a 200× magnified photograph of a glass or glass ceramic article comprising copper-metallized through holes with no radial cracks when heated at a substantially constant heating rate of 6.5° C./min according to embodiments disclosed and described herein.
Figure 10:
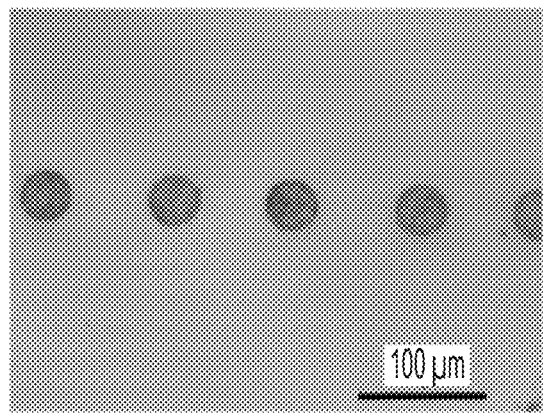
FIG. 10 is a 200× magnified photograph of a glass or glass ceramic article comprising copper-metallized through holes with no radial cracks when heated at a variable heating rate and an average heating rate of 2.3° C./min according to embodiments disclosed and described herein.

However, at a heating rate of 6.5° C./min, no cracks were observed, as shown in FIG. 9A (50×) and FIG. 9B (200×). Similarly, no cracks were observed for samples annealed using a variable heating rate with an average heating rate of 2.3° C./min, as shown in FIG. 10 (200×).

Table 2 below summarizes the results of the above tests.

TABLE 2

| Total Heating Time to 420° C. (min) | Average Heating Rate (° C./min) | Number of Radial Cracks on Die | Radial Crack Density (cracks/mm²) |
|---|---|---|---|
| 15 | 26.0 | 375 | 1.91 |
| 30 | 13.0 | 8 | 0.04 |
| 45 | 8.7 | 4 | 0.02 |
| 60 | 6.5 | 0 | 0 |
| 180 | 2.3 | 0 | 0 |

From the summarized results presented in Table 2, it was observed that for heating rates below 8.7° C./min radial cracks are at a minimum, and at heating rates ≥8.7° C./min the number of radial cracks on the die increased with increasing heating. However, at heating rates below 8.7° C./min the number of cracks was minimal and eventually the cracks were not present at heating rates ≤6.5° C./min. This clearly indicates that the formation of radial crack is a time-dependent phenomenon.

Figure 11:
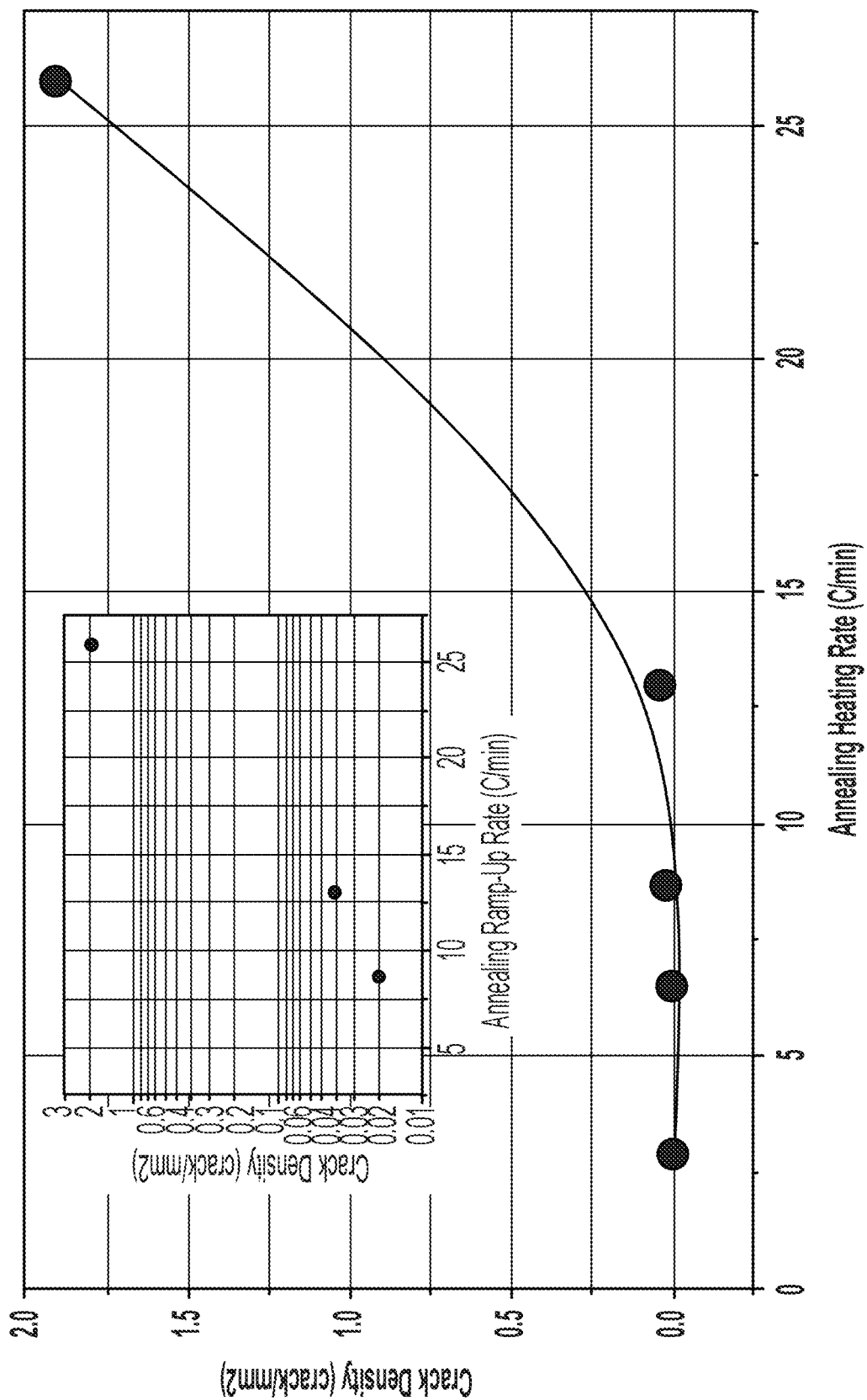
FIG. 11 graphically depicts heating crack density versus heating rate for glass or glass ceramic articles comprising copper-metallized through holes.

Additionally, the crack density was calculated as shown in Table 2 and presented graphically in FIG. 11. Crack density was found to exponentially increase with the used annealing heating rate. FIG. 11 clearly indicates that the formation of radial cracks is a rate-dependent phenomenon. This also shows that radial crack formation is stress driven, emanating from the mismatch in the CTE of copper and its surrounding glass matrix. As such, the absence of cracks for heating rates ≤6.5° C./min, suggests sufficient activation of rate-controlled stress relaxation mechanisms in the copper-metallized through holes. Further, because limited amounts of cracks are observed at heating rates below 8.7° C./min, this means that for heating rates <8.7° C./min, the stresses in the copper-metallized through holes are lower, leading to lower induced stresses in the glass that are below the threshold critical stress value needed for the initiation of cracks in the glass.

Figure 12A:
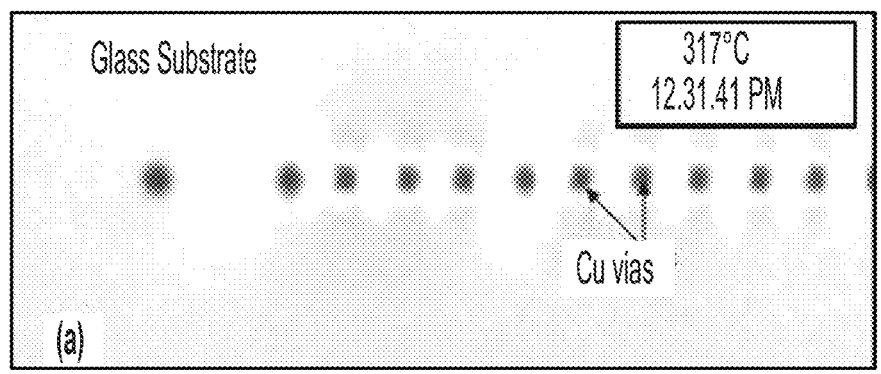
FIGS. 12A-12C show radial crack formation of copper-metallized through holes heated at 20.5° C./min over time.
Figure 12B:
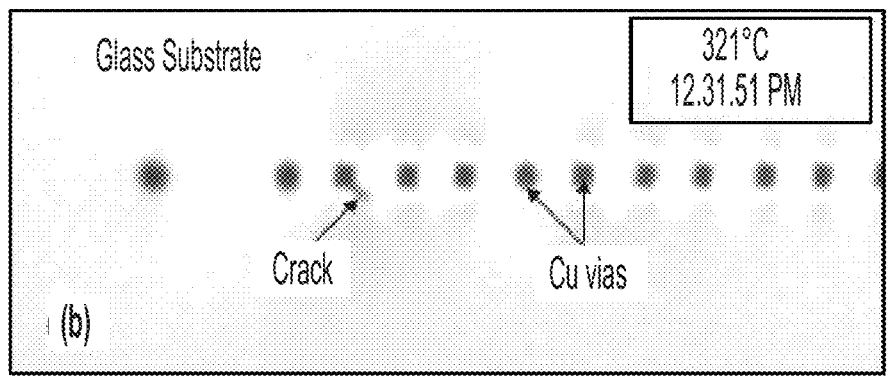
Figure 12C:
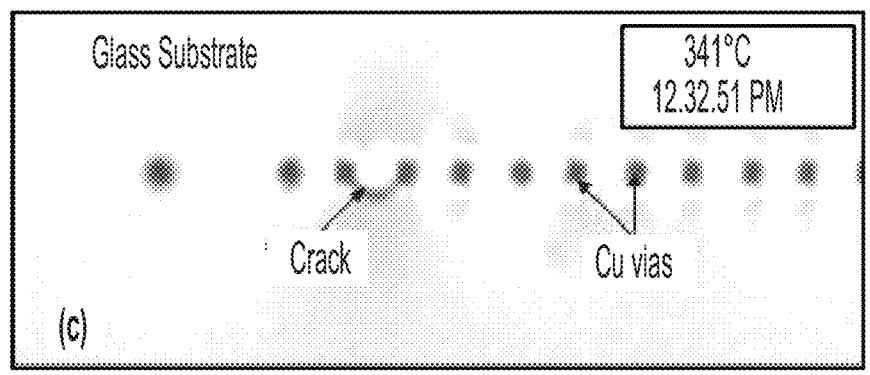

FIGS. 12A-12C are in-situ, temperature-dependent images of copper-metallized through holes. Visually, at 317° C., no radial cracks were observed (FIG. 12A). However, after 10 seconds, a crack is observed to propagate from the third copper-metallized through hole from the left, which corresponds to a temperature of 321° C. (FIG. 12B). Further increases in temperature resulted in growth of the crack until it finally connected to the adjacent copper-metallized through hole (i.e., the fourth copper-metallized through hole from the left) sixty seconds later, as shown in FIG. 12C. Although the radial crack was first observed at 321° C., it may have developed at lower temperatures due to the setup of the testing protocol. For instance, images were only capture every 10 seconds.

Figure 13:
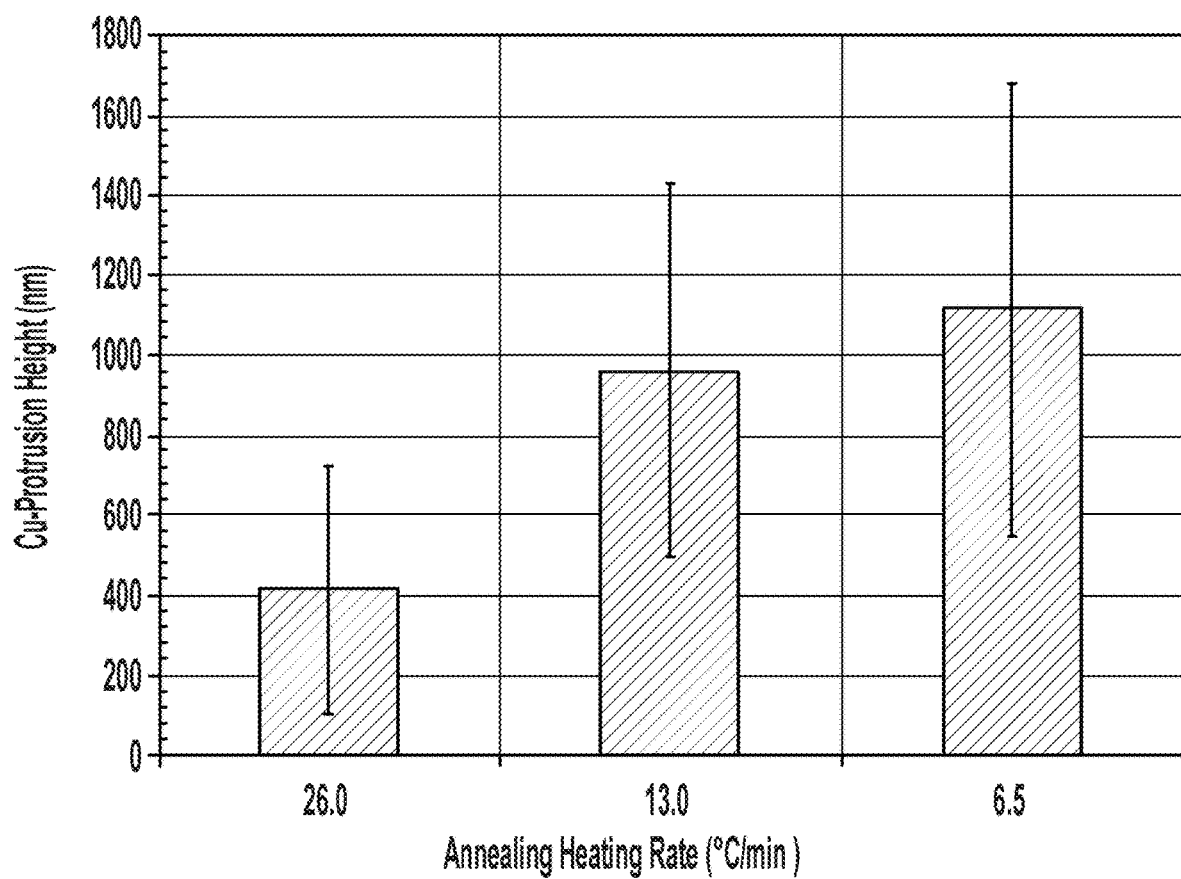
FIG. 13 graphically depicts copper protrusion versus annealing heating rate.

To more fully understand the activity of stress relaxation mechanisms, further experimental study was done by the measurement of the copper protrusion after annealing with respect to the annealing heating rate, which is presented in FIG. 13. Copper protrusion is the inelastic out-of-plane deformation. It occurs during heating due to the buildup of high compressive stresses in the copper due to the mismatch in the CTE of the copper and the surrounding glass substrate. Copper protrusion is a combination of plastically deformed copper, as well as hillock formation. Plastic deformation occurs due to the attainment of the yield strength of copper, which decreases with increasing temperature. On the other hand, hillock formation is a preferential out-of-plane displacement of Cu grain by grain boundary sliding (GBS) phenomenon. GBS is a stress relaxation mechanism which is a diffusion controlled mechanism that results in the approximate translation of one grain over another, parallel to the boundary interface. GBS leads to the formation of copper protrusion due to the vertical displacement of grains during translation.

In FIG. 13, it was measured that the copper protrusion height increased with increasing heating time, in order words, the copper protrusion increased with decreasing heating rates. For instance, the amount of Cu protrusion at a heating rate of 26.0° C./min was measured to be 400 nm, however, when a heating rate of 6.5° C./min was used, the copper protrusion height was measured to be about 1100 nm. FIG. 13, shows a strong dependence of copper protrusion on the used annealing heating rate. Based on Table 2 and FIG. 13, it can be inferred that the increase in copper protrusion results in the decrease in the number of formed radial cracks. This is due to the increased activity of stress relaxation mechanisms with increased heating time or decreased heating rate. GBS is known to be a rate-controlled stress relaxation mechanism that is also accompanied by the formation of micro-voids, as such, its activity increases with lower annealing heating rate. This means that the activity of GBS and plastic deformation sufficiently relaxes the built up stresses in copper below the critical stress threshold needed for the formation of radial cracks when ramp-up rates <8.7° C./min, such as ≤6.5° C./min were used.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A process comprising:
    heating a glass or glass ceramic article comprising copper-metallized through holes to a first temperature, wherein the first temperature is greater than or equal to 220° C. and less than or equal to 300° C.,
    holding the glass or glass ceramic article comprising copper-metallized through holes at the first temperature for a duration of greater than or equal to 10 minutes and less than or equal to 120 minutes, and
    heating the glass or glass ceramic article comprising copper-metallized through holes from the first temperature to a second temperature, wherein the second temperature is greater than or equal to 350° C. and less than or equal to 450° C.,
    wherein an average heating rate during the heating of the glass or glass ceramic article comprising copper-metallized through holes from the first temperature to the second temperature is greater than 0.0° C./min and less than 8.7° C./min.

2. The process of claim 1, wherein the heating of the glass or glass ceramic article comprising copper-metallized through holes from the first temperature to the second temperature does not cause radial cracks in the glass or glass ceramic article comprising copper-metallized through holes.

3. The process of claim 1, further comprising heating the glass or glass ceramic article comprising copper-metallized through holes from room temperature to the first temperature.

4. The process of claim 3, wherein an average heating rate during the heating of the glass or glass ceramic article comprising copper-metallized through holes from room temperature to the first temperature is greater than 0.0° C./min and less than 8.7° C./min.

5. The process of claim 1, wherein the first temperature is from greater than or equal to 225° C. and less than or equal to 275° C.

6. The process of claim 1, wherein the second temperature is from greater than or equal to 375° C. and less than or equal to 425° C.

7. The process of claim 1, wherein the average heating rate during the heating of the glass or glass ceramic article comprising copper-metallized through holes from the first temperature to the second temperature is greater than or equal to 1.0° C./min and less than or equal to 6.5° C./min.

8. The process of claim 1, wherein the average heating rate during the heating of the glass or glass ceramic article comprising copper-metallized through holes from the first temperature to the second temperature is substantially constant.

9. The process of claim 1, wherein the average heating rate during the heating of the glass or glass ceramic article comprising copper-metallized through holes from the first temperature to the second temperature is variable.

10. The process of claim 1, wherein the process further comprises holding the glass or glass ceramic article comprising copper-metallized through holes at a constant temperature between the first temperature and the second temperature for a duration of greater than or equal to 10 minutes and less than or equal to 120 minutes.

11. The process of claim 1, wherein the process further comprises holding the glass or glass ceramic article comprising copper-metallized through holes at the second temperature for a duration of greater than or equal to 10 minutes and less than or equal to 120 minutes.

12. The process of claim 1, wherein the heating of the glass or glass ceramic article comprising copper-metallized through holes from the first temperature to the second temperature comprises holding the glass or glass ceramic article comprising copper-metallized through holes at a constant temperature for a duration that is greater than or equal to 10 minutes and less than or equal to 60 minutes.

13. The process of claim 1, wherein a diameter of the through holes in the glass or glass ceramic article comprising copper-metallized through holes is greater than or equal to 25 μm and less than or equal to 75 μm.

14. The process of claim 1, wherein a pitch of the through holes in the glass or glass ceramic article comprising copper-metallized through holes is greater than or equal to 60 μm and less than or equal to 800 μm.

15. The process of claim 1, wherein a depth of the through holes in the glass or glass ceramic article comprising copper-metallized through holes is greater than or equal to 50 μm and less than or equal to 600 μm.

16. The process of claim 1, wherein the glass or glass ceramic article comprises at least 90 wt % silica.

17. A process, comprising:
heating a glass or glass ceramic article comprising copper-metallized through holes to a first temperature, wherein the first temperature is greater than or equal to 240° C. and less than or equal to 260° C.;
holding the glass or glass ceramic article comprising copper-metallized through holes at the first temperature for a duration of greater than or equal to 10 minutes and less than or equal to 120 minutes; and
heating the glass or glass ceramic article comprising copper-metallized through holes from the first temperature to a second temperature, wherein the second temperature is greater than or equal to 400° C. and less than or equal to 450° C.,
wherein an average heating rate during the heating of the glass or glass ceramic article comprising copper-metallized through holes from the first temperature to the second temperature is greater than 0.0° C./min and less than or equal to 6.5° C./min.

* * * * *

UNITED STATES PATENT AND TRADEMARK OFFICE
CERTIFICATE OF CORRECTION

PATENT NO. : 11,760,682 B2
APPLICATION NO. : 16/781340
DATED : September 19, 2023
INVENTOR(S) : Chukwudi Azubuike Okoro It is certified that error appears in the above-identified patent and that said Letters Patent is hereby corrected as shown below:

On the Title Page

On the Page 4, in Column 1, item (56) under "Other Publications", Line 1, delete "Letiers;" and insert -- Letters; --.

On the Page 4, in Column 1, item (56) under "Other Publications", Line 37, delete "20Overview" and insert -- 20Overview --.

On the Page 4, in Column 1, item (56) under "Other Publications", Line 66, delete "Enbineering;" and insert -- Engineering; --.

On the Page 4, in Column 2, item (56) under "Other Publications", Line 30, delete "elecliical" and insert -- electrical --.

On the Page 5, in Column 1, item (56) under "Other Publications", Line 5, delete "Packagingi" and insert -- Packaging --.

On the Page 5, in Column 1, item (56) under "Other Publications", Line 12, delete "Ouartz" and insert -- Quartz --.

On the Page 5, in Column 1, item (56) under "Other Publications", Line 20, delete "Electroles" and insert -- Electroless --.

On the Page 5, in Column 1, item (56) under "Other Publications", Line 23, delete "Reliabi F" and insert -- Reliable --.

On the Page 5, in Column 1, item (56) under "Other Publications", Line 42, delete "Iterposer:" and insert -- Interposer: --.

Signed and Sealed this
Fifth Day of March, 2024

Katherine Kelly Vidal
*Director of the United States Patent and Trademark Office*

CERTIFICATE OF CORRECTION (continued)
U.S. Pat. No. 11,760,682 B2

On the Page 5, in Column 2, item (56) under "Other Publications", Line 3, delete "Contianing" and insert -- Containing --.

On the Page 5, in Column 2, item (56) under "Other Publications", Line 10, delete "Aminosiline" and insert -- Aminosilane --.

On the Page 5, in Column 2, item (56) under "Other Publications", Line 45, delete "Technolgy"," and insert -- Technology", --.

On the Page 5, in Column 2, item (56) under "Other Publications", Line 50, delete "Electomic Componsents" and insert -- Electronic Components --.

In the Claims

In Column 18, Line 23, in Claim 1, delete "300° C.," and insert -- 300° C.; --.

In Column 18, Line 27, in Claim 1, delete "minutes," and insert -- minutes; --.